United States Patent [19]

Price et al.

[11] Patent Number: 4,636,475

[45] Date of Patent: * Jan. 13, 1987

[54] APPARATUS AND METHOD FOR MONITORING STORED MATERIAL

[76] Inventors: William E. Price, 16252 Candelwood, Houston, Tex. 77642; Louie A. Galloway, III, 410 Elmwood Dr., Lafayette, La. 70503; Charles B. Lowrey, Rte. 1, Box K-78, Beaumont, Tex. 77706; Donald R. Lewis, 9219 Lasater, San Antonio, Tex. 78250

[*] Notice: The portion of the term of this patent subsequent to Jun. 4, 2002 has been disclaimed.

[21] Appl. No.: 693,611

[22] Filed: Jan. 22, 1985

Related U.S. Application Data

[62] Division of Ser. No. 296,429, Aug. 26, 1981, Pat. No. 4,521,372.

[51] Int. Cl.$^4$ .............................................. G01N 31/00
[52] U.S. Cl. ..................... 436/3; 73/40.5 R; 73/49.2; 376/250; 252/964; 422/903
[58] Field of Search ............... 376/250, 251, 253, 272; 250/507.1; 73/40, 40.5 R, 49.2; 252/964; 436/3; 422/903

[56] References Cited

U.S. PATENT DOCUMENTS

| | | | |
|---|---|---|---|
| 4,040,480 | 8/1977 | Richards | 422/903 X |
| 4,055,508 | 10/1977 | Yoli et al. | 422/903 X |
| 4,058,479 | 11/1977 | White et al. | 422/903 X |
| 4,521,372 | 6/1985 | Price | 376/250 |

FOREIGN PATENT DOCUMENTS

| | | | |
|---|---|---|---|
| 1150248 | 6/1963 | Fed. Rep. of Germany | 73/49.2 |
| 1456860 | 12/1976 | United Kingdom . | |

*Primary Examiner*—Teddy S. Gron
*Assistant Examiner*—Susan Wolffe
*Attorney, Agent, or Firm*—Vinson & Elkins

[57] ABSTRACT

An apparatus and method for monitoring stored material is disclosed. Material to be stored and monitored is placed within the innermost container of a series of nested containers and monitoring fluids are circulated in a closed loop of fluid flow through the spaces between the nested containers. Monitoring devices are used to analyze said monitoring fluids to detect leakage of the stored material from the innermost nested container and to detect the migration of external fluids into the series of nested containers. A computer based monitoring system continually checks the values of various parameters of the monitoring fluids to immediately detect and report the presence of stored material or external fluid in the monitoring fluids. The stored material may then be immediately retrieved from storage to repair leaks in the series of nested containers. The invention is particularly suited for monitoring the storage of hazardous material such as radioactive waste material.

36 Claims, 22 Drawing Figures fig.2 SECTIONAL SIDE VIEW OF A FIRST CONTAINER WITHIN A SECOND CONTAINER

TOP VIEW
OF THE TOP END CAP
OF THE FIRST CONTAINER

END VIEW
OF THE FIRST CONTAINER

BOTTOM VIEW
OF THE BOTTOM END CAP
OF THE FIRST CONTAINER

ASSEMBLED FIRST CONTAINER

TOP VIEW OF THE
TOP END CAP OF THE
SECOND CONTAINER

BOTTOM VIEW OF THE
TOP END CAP OF THE
SECOND CONTAINER

END VIEW OF THE
SECOND CONTAINER

TOP VIEW OF THE
BOTTOM END CAP OF THE
SECOND CONTAINER

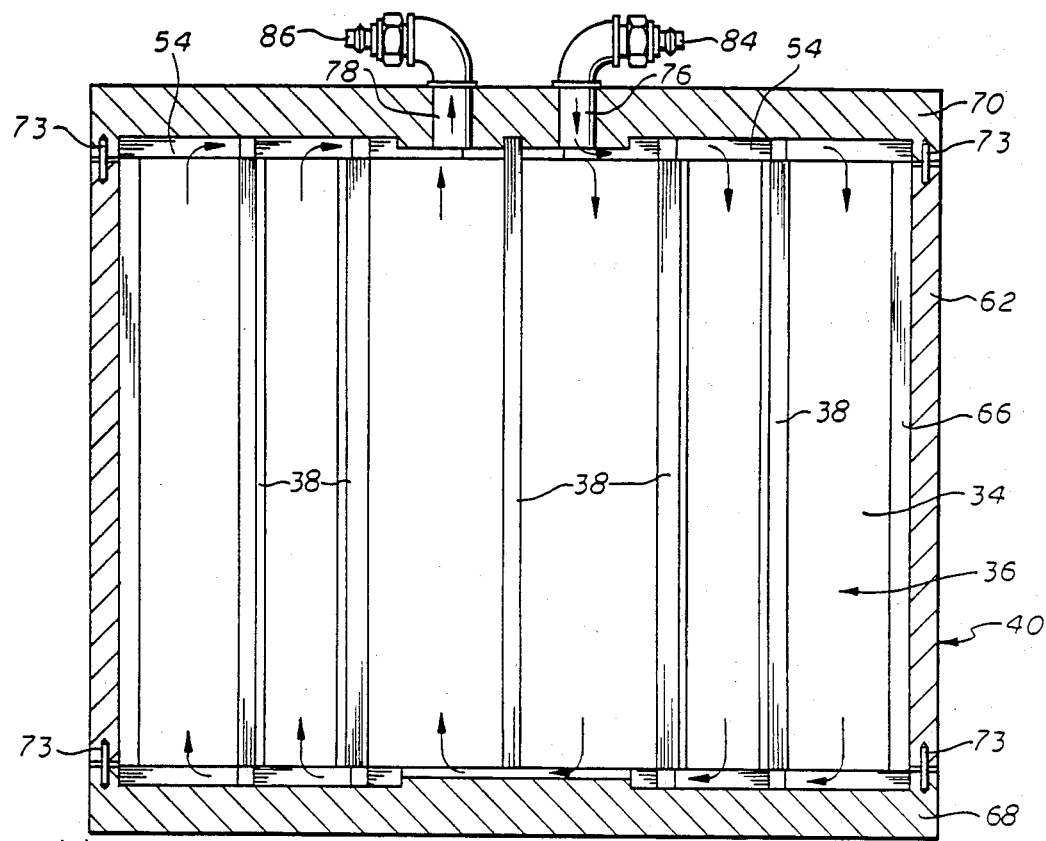
fig.11 PARTIAL SECTIONAL SIDE VIEW OF A FIRST CONTAINER WITHIN A SECOND CONTAINER
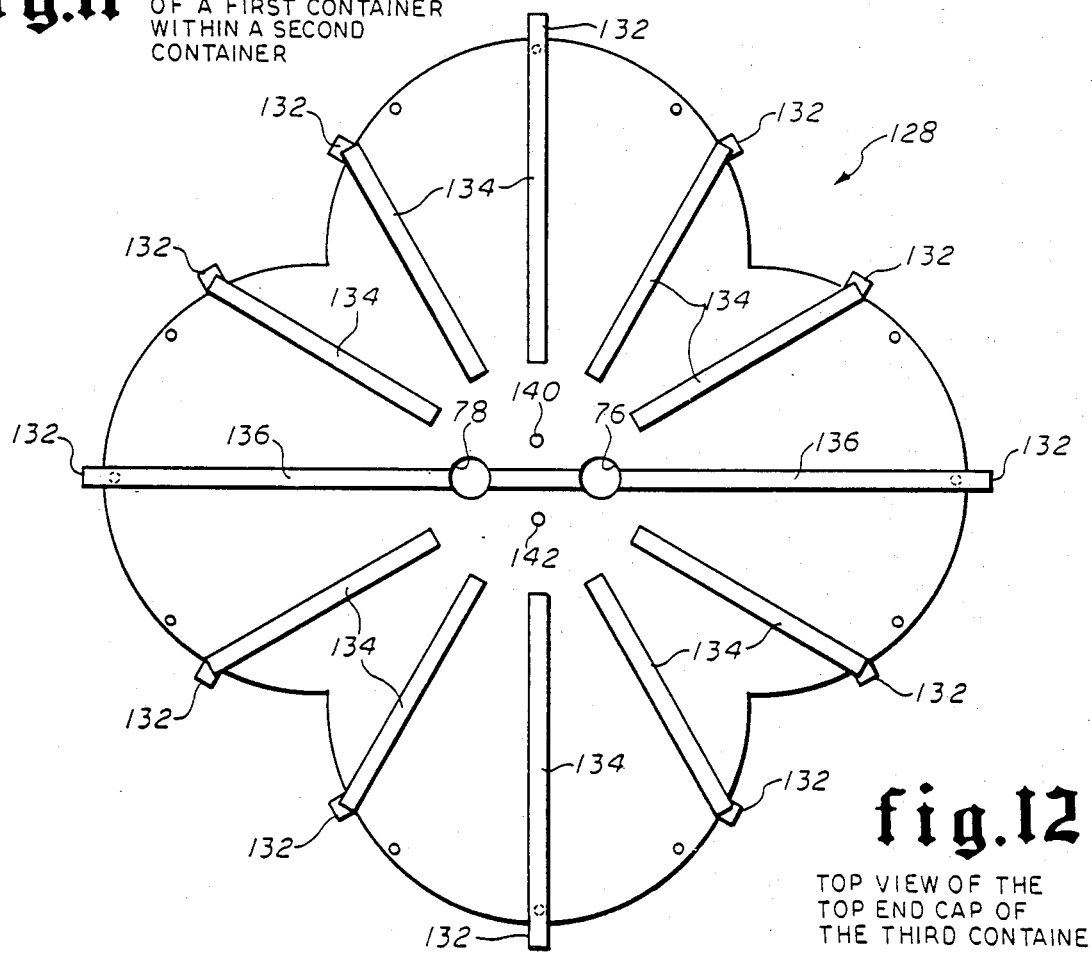
fig.12 TOP VIEW OF THE TOP END CAP OF THE THIRD CONTAINER

BOTTOM VIEW OF
THE TOP END CAP OF
THE THIRD CONTAINER

END VIEW OF THE
THIRD CONTAINER

TOP VIEW OF THE
BOTTOM END CAP OF
THE THIRD CONTAINER

BOTTOM VIEW OF THE
BOTTOM END CAP OF THE
THIRD CONTAINER

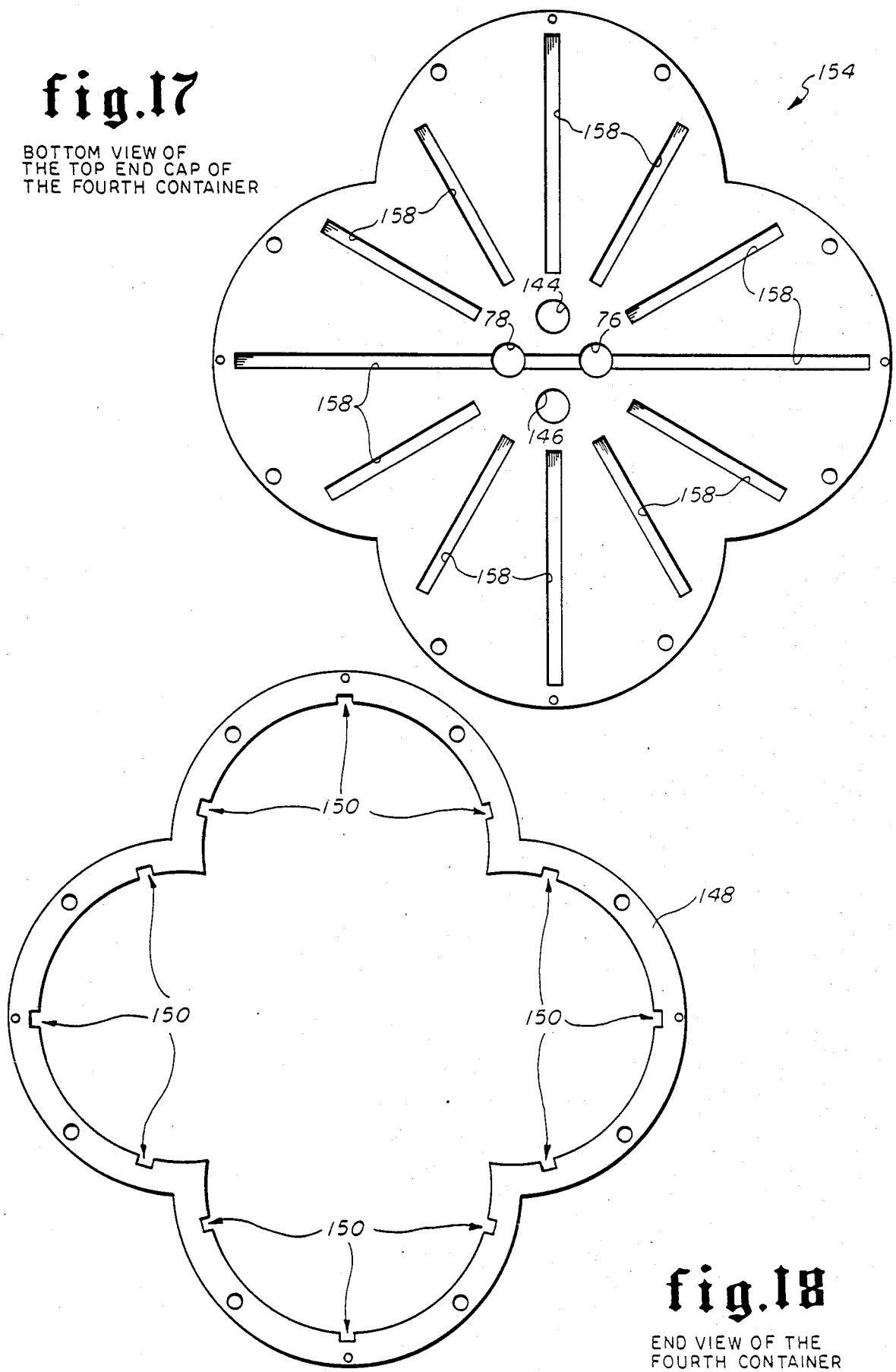

TOP VIEW OF THE BOTTOM END CAP OF THE FOURTH CONTAINER

SECTIONAL SIDE VIEW OF A SERIES OF FOUR NESTED CONTAINERS

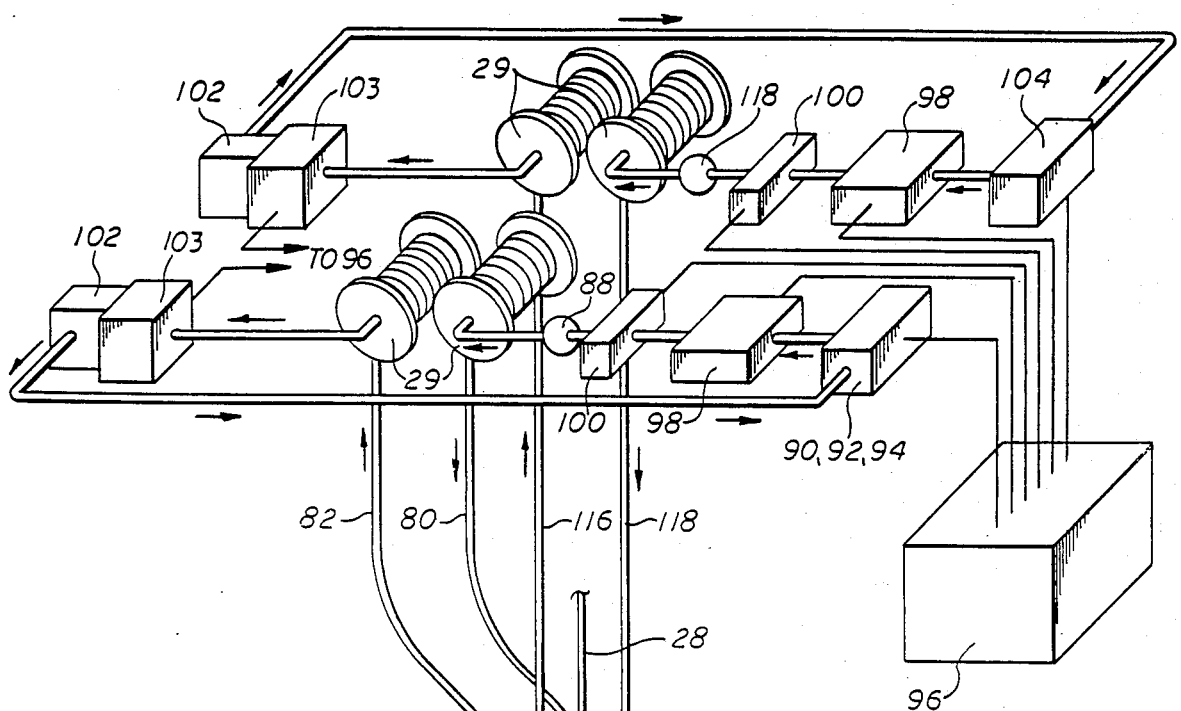
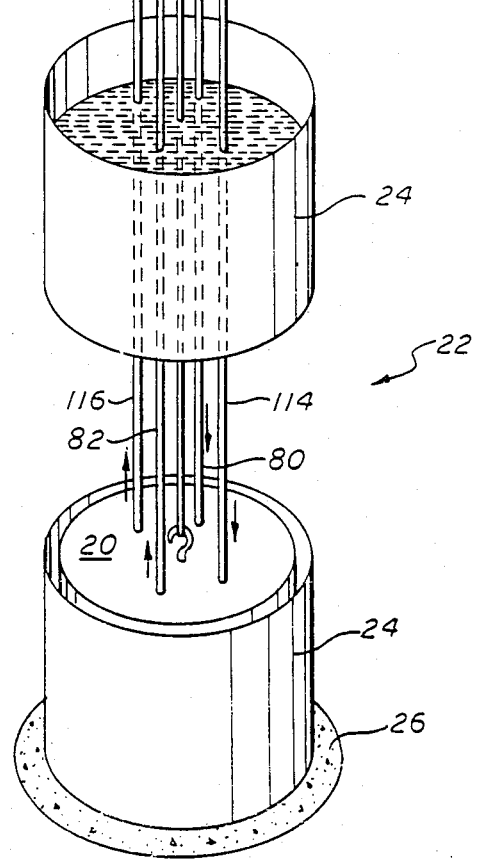
fig.21

APPARATUS AND METHOD FOR MONITORING STORED MATERIAL

This is a division of application Ser. No. 296,429 filed on Aug. 26, 1981, now U.S. Pat. No. 4,521,372.

This invention relates generally to the storage of material and in particular to the monitoring of storage containers to detect leakage of material from the storage containers and to detect the migration of fluids into the storage containers. The stored material may be immediately retrieved from storage when the leakage of material from the storage containers is detected or when the migration of fluid into the storage containers is detected. The invention is particularly suited for monitoring the storage of hazardous material such as radioactive waste material.

BACKGROUND OF THE INVENTION

Numerous industrial processes generate waste material. Some types of waste material are hazardous to the environment by virtue of their dangerous chemical or physical properties. Such hazardous waste materials include radioactive wastes, carcinogens, chemical insecticides and pesticides, acids, corrosives, active metal compounds, nerve gases and materials contaminated by such substances. In order to prevent such waste materials from damaging and contaminating the environment, it is necessary either to render the materials harmless or to isolate the materials from the environment in a waste storage facility.

High level radioactive waste materials generated by the operation of nuclear reactors in nuclear power plants are especially dangerous due to the high levels of radioactivity which remain present in the radioactive waste materials for many, many years. Some of the radioactive isotopes in the spent fuel elements of a nuclear reactor or in other high level radioactive waste materials have very long half lives. The leakage of such radioactive waste material could cause long-term radioactive contamination of the environment. An additional problem that arises in the storage of high level radioactive waste materials is the problem of disposing of the heat from the decay of the radioactive isotopes in the stored high level radioactive waste materials.

A similar problem arises with respect to low level radioactive waste materials including numerous radioactive isotopes used in medicine and scientific research. Although such low level radioactive waste materials may exhibit a lower level of radioactivity and heat production than high level radioactive waste materials, such low level radioactive waste materials still pose the threat of long-term contamination of the environment. In addition, when large quantities of such low level radioactive waste materials are stored in the aggregate, the cumulative levels of radioactivity and heat production are not insignificant.

Although the apparatus and method of the present invention may be used to monitor the storage of all types of hazardous and non-hazardous materials, it finds one of its most useful applications in connection with the monitoring of the storage of radioactive waste materials. The continued operation of nuclear reactors will generate an ever increasing amount of high level radioactive wastes in the form of spent fuel elements. Presently, such high level radioactive wastes are being stored in various underground sites such as caves. The possible dangers of environmental contamination inherent in unmonitored underground storage can be avoided if the radioactive waste materials are stored and monitored using the apparatus and method of the present invention.

SUMMARY OF THE INVENTION

The apparatus of the present invention generally comprises a series of nested containers and means for circulating fluids between the containers. The innermost container in the series of nested containers holds the material to be stored and monitored. The spaces between the nested containers are filled with circulating fluids. Said circulating fluids are designed to monitor the environment in the immediate area of the nested containers. Said circulating fluids may also be circulated through heat exchangers to cool said monitoring fluids thereby removing heat from the stored materials.

The nested containers of the present invention are provided with a plurality of conduits for carrying circulating fluids to and from the nested containers when the containers have been lowered into a storage cell. In the present embodiment of the invention, said storage cell comprises a cylindrical metal casing vertically disposed and cemented within an excavation in the earth. In the preferred embodiment of the invention, said casing possesses a length of approximately 100 feet and possesses an inner diameter sufficiently large enough to receive the nested containers. The nested containers and associated conduits for transporting the monitoring fluids may be lowered to the bottom of said storage cell, thereby causing said nested containers to come to rest approximately 100 feet below the surface of the earth. The storage cell may be filled with a fluid such as water to provide additional shielding for the stored materials.

The nested containers are lowered into said storage cell on a support cable. If at any time it is desired to retrieve the stored materials, the nested containers may be raised simply by exerting a lifting force on said support cable with conventional means such as a winch.

The circulating fluids which pass through the conduits connecting the nested containers with the surface convey information concerning the status of the materials contained within said nested containers. For example, a liquid scintillation fluid may be used to detect whether any radioactive material is leaking from the innermost nested container containing radioactive material. By way of further example, it is possible to monitor the scintillation fluid for the presence of water in said fluid to detect increased levels of water in said fluid indicative of the migration of water into the nested containers from outside the containers. Volume monitoring devices are used to detect whether any leakage of the monitoring fluids is occurring. As previously mentioned, it is also possible to use heat exchangers to cool said monitoring fluids, thereby removing heat from said stored material.

A computer based monitoring system continually measures the value of various parameters of the monitoring fluids to determine the existence of any anomalous condition as soon as it occurs. Detection of an anomalous condition causes the computer system to immediately generate an alarm indicating both the anomalous condition detected and the location of the particular storage cell involved. Having been alerted by the alarm, the operator of the storage facility may immediately take whatever action is appropriate to respond to the particular anomalous condition. Alternatively, the computer system may be programmed to immediately take action itself to correct the anomalous condition.

The apparatus and method of the invention provides a means for safely and retrievably storing materials. With respect to the storage of hazardous materials, it is noted that the retrievability feature of the apparatus and method of the invention provides means for recovering the stored hazardous materials for later use. For example, future developments in technology may make it possible to reprocess radioactive materials such as spent fuel elements from nuclear reactors to recover valuable radioactive materials. Such a development would turn what is now "waste" into a valuable natural resource. Methods currently in use for non-retrievably storing such radioactive "waste" material would not permit the easy and rapid retrieval of such material from storage.

The apparatus and method of the invention are not designed to provide a means for the permanent disposal of nuclear waste materials. It is seen, however, that nuclear waste materials can be safely and retrievably stored in the apparatus of the invention for an indefinite period of time. In this manner hazardous nuclear waste materials can be safely contained until permanent disposal techniques are perfected.

The apparatus and method of the invention also provide a significant degree of protection for the environment. Because any leakage of stored material or similar malfunction can be immediately detected and corrected, there is very little risk that the environment will be harmed. Further, use of the apparatus and method of the invention will enhance the safety of individuals engaged in the work of handling and storing hazardous materials.

OBJECTS OF THE INVENTION

It is an object of the apparatus and method of the invention to provide a means for the safe and retrievable storage of materials.

Another object of the apparatus and method of the invention is to provide means for continually monitoring the seal integrity against leakage of the containers containing the stored materials in order to immediately detect any leakage of said stored materials.

Still another object of the apparatus and method of the invention is to provide means for continually monitoring the seal integrity against leakage of the containers containing the stored materials in order to detect the migration of fluids into said stored materials.

A further object of the apparatus and method of the invention is to provide means for removing heat from stored materials that generate heat such as radioactive waste materials.

Yet another object of the apparatus and method of the invention is to temporarily provide continually monitored and retrievable storage for radioactive waste materials until a safe method of permanently disposing of such materials is found.

These and other objects and features of advantage of the invention will be apparent from the drawings, the detailed description, and the appended claims.

BRIEF DESCRIPTION OF THE DRAWINGS

In the drawings in which is shown a preferred embodiment the invention may assume, and in which like numerals indicate like parts.

FIG. 11 is a partial sectional side view of a first container within a second container showing the location of metal ribs for directing the flow of fluid around said first container when said first container is within said second container and showing the direction of fluid flow around said first container; and FIG. 12 is a top view of the top end cap of a third container for containing the second container showing the location of the entry port and exit port of the conduits leading to and from said third container and showing the entry port and exit port for conduits leading to and from said second container;

FIG. 17 is a bottom view of the top end cap of a fourth container for containing the third container showing grooves within the bottom of said top end cap for receiving metal ribs for directing the flow of fluid around said third container and showing the entry port and exit port for conduits leading to and from said third container and for conduits leading to and from said second container within said third container;

FIG. 18 is an end view of the fourth container for containing the third container;

FIG. 21 is a schematic perspective view showing conduits for transporting fluid to and from a series of nested containers and showing means for monitoring the fluid circulating between the containers to monitor the storage conditions of material stored within the containers.

DESCRIPTION OF THE PREFERRED EMBODIMENT

The apparatus and method of the invention may be used to monitor both hazardous and non-hazardous stored material. The description of the preferred embodiment, however, will be directed to a version of the apparatus and method for monitoring stored hazardous waste materials. It will be understood that the numerous safeguards necessary to safely and efficiently monitor hazardous waste materials will not in all cases be necessary when the material to be stored is non-hazardous. For example, a scintillation detector for detecting the leakage of stored radioactive materials is not needed when the stored material is not radioactive.

Because highly radioactive materials are probably the most hazardous materials which the apparatus and method of the invention will be called upon to monitor, the description of the preferred embodiment will be specifically directed to monitoring stored materials of a highly radioactive nature. It will be understood that the apparatus and method of the invention may be equally well adapted to monitor other hazardous materials such as low level radioactive materials and toxic chemicals. For example, if one desires to monitor the storage of a particular toxic chemical then the detecting equipment used in the apparatus of the invention will be designed to detect that particular toxic chemical.

Figure 1:
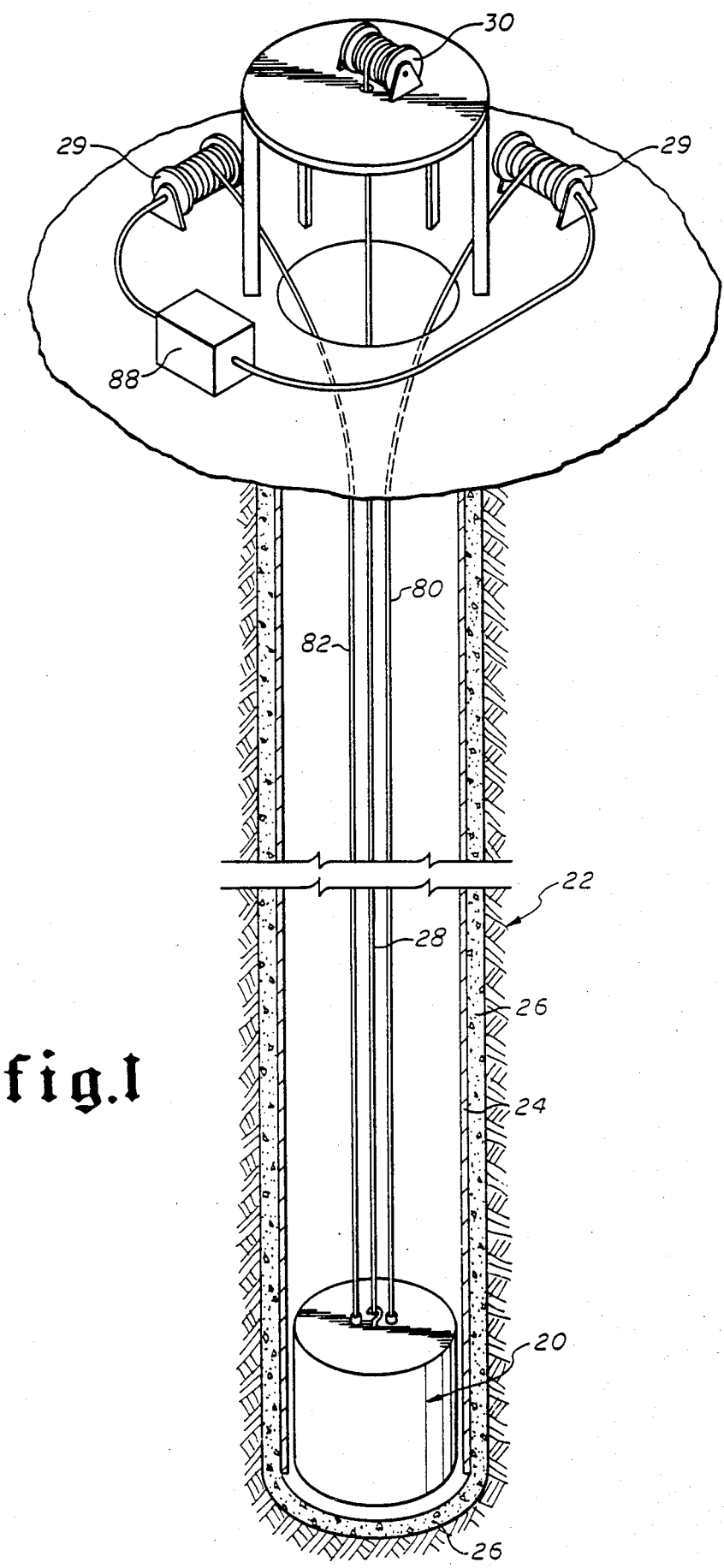
FIG. 1 is a schematic view of a storage cell constructed in accordance with the invention and illustrating a set of nested containers together with means for raising and lowering said containers.

The numeral 20 generally denotes a series of nested containers for containing the material to be stored and monitored. As shown in FIG. 1, the nested containers 20 may be stored within a storage cell 22. In the preferred embodiment of the invention storage cell 22 comprises a cylindrical metal casing 24 vertically disposed and cemented within an excavation in the earth. The cement 26 generally extends over the exterior surface of casing 24 between casing 24 and the surrounding earth. The cement 26 used to cement said casing 24 extends horizontally across the open bottom of said casing 24 thereby forming a base upon which the nested containers 20 may rest when said nested containers 20 are lowered by a support cable 28 to the bottom of casing 24 of storage cell 22. Cement 26 forms a watertight seal closing the open bottom end of casing 24 thereby enabling storage cell 22 to hold water. Storage cell 22 may be filled with water to provide additional shielding material for further isolating the nested containers 20 at the bottom of storage cell 22.

Support cable 28 is connected to conventional means such as a winch 30 for exerting a lifting force on the nested containers 20 to raise the nested containers 20 to the top of storage cell 22 when the retrieval of the materials stored within nested containers 20 is desired. Conduit take-up reels 29 roll up and unroll the conduits, 80 and 82, that conduct fluid to nested containers 20. The hollow axle (not shown) of each conduit take-up reel 29 is constructed having an aperture therein through which its respective conduit, 80 or 82, extends permitting said conduit, 80 or 82, to pass through and exit from said hollow axle as shown in FIG. 1. In this manner a continuous closed loop of fluid flow may be maintained through the conduit, 80 or 82, at all times.

Figure 4:
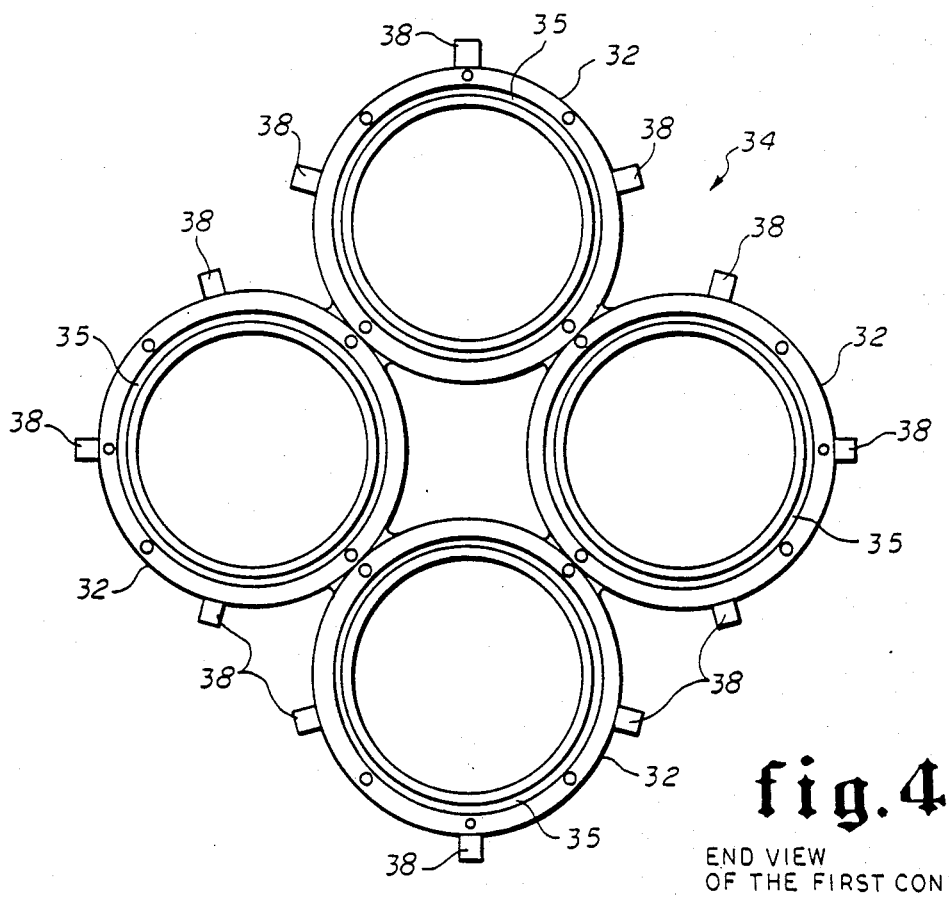
FIG. 4 is an end view of the first container showing four cylindrically shaped compartments for containing material to be stored.

Turning now to a detailed description of the first and innermost container for containing the material to be stored, one sees by referring to FIG. 4 that said first container generally comprises a group of four cylindrically shaped hollow tubes 32 which may be welded or otherwise fixed together. Of course, other geometric designs for the first container could be employed, including that of a single cylinder. In the preferred embodiment of the invention utilizing the four tube design shown in FIG. 4, the tubes 32 are made of copper. The copper facilitates the efficient transmission of heat from the stored material within the tubes 32 to fluid flowing over the external surfaces of the tubes 32.

Figure 2:
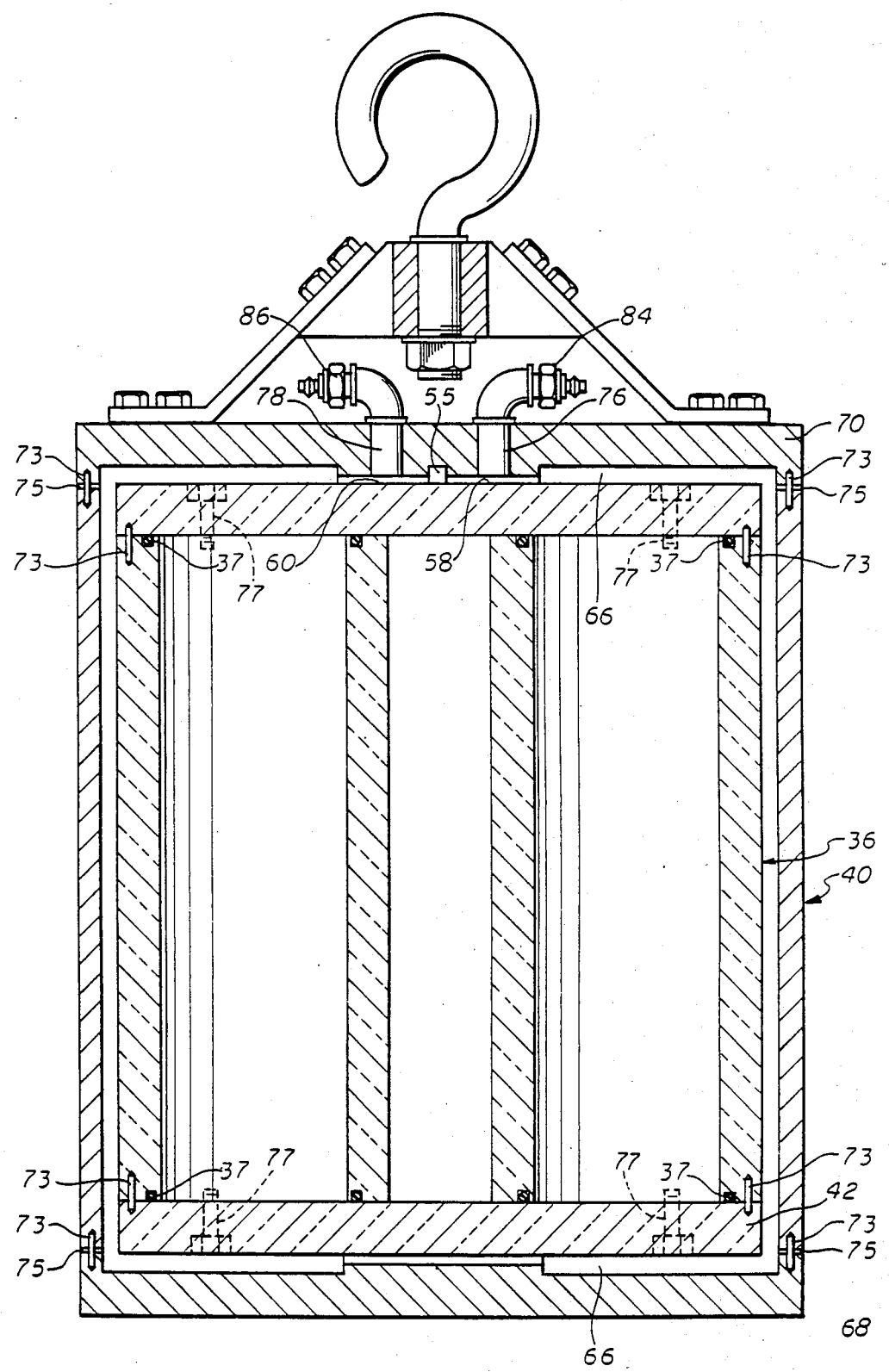
FIG. 2 is a vertical sectional side view of a first container within a second container showing the nesting of the containers and showing the connection for conduits for transporting fluids to and from a cavity between said containers.
Figure 6:
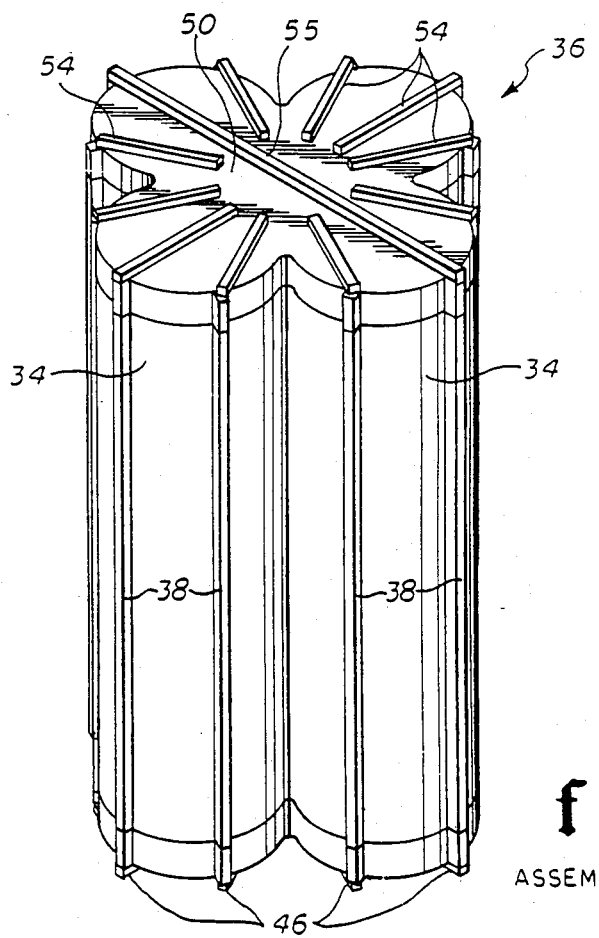
FIG. 6 is a perspective view showing an assembled first container.

The inner diameter of each tube 32 is large enough to slidably receive one fuel rod of the type typically used in pressurized water reactors in nuclear power plants. Each tube 32 is long enough to completely contain within it one such fuel rod. The four tubes 32 comprise the body 34 of first container 36 (as shown in FIGS. 2 and 6). Each end of each tube 32 is formed with a groove 35 for receiving an O-ring 37 (as shown in FIG. 2) in the end surface of said tube 32. An O-ring 37 placed within groove 35 of each tube 32 insures that the ends of the tubes 32 may be tightly sealed against leakage.

As shown in FIG. 4 and in FIG. 6, the outermost surface of each tube 32 of first container 36 possesses longitudinal ribs 38 disposed along the entire length of each tube 32. In the preferred embodiment of the invention, each longitudinal rib 38 is constructed of stainless steel and has a substantially rectangular cross-sectional area. As will be described more fully below, the longitudinal ribs 38 serve as partition members for directing the flow of fluid around said first container 36 while said first container 36 is contained within a second container 40 as depicted in FIG. 2.

Figure 5:
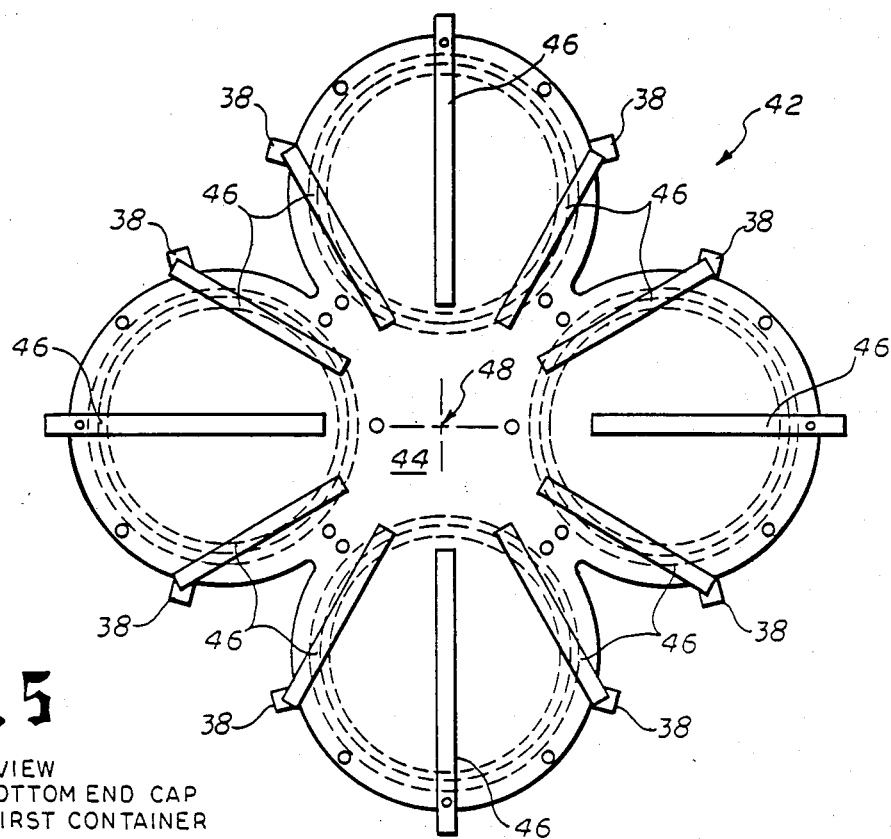
FIG. 5 is a bottom view of the bottom end cap of the first container showing the placement of metal ribs for directing the flow of fluid around said first container.

Once the material to be stored within said first container has been placed within said tubes 32, the ends of said body 34 of said first container are sealed. The bottom end of said body 34 is sealed with a bottom end cap 42 constructed as shown in FIG. 5. Said bottom end cap 42 generally comprises a substantially flat metal plate 44 having a size and shape large enough to seal the four tubes 32 of said body 34 of said first container 36. Bottom end cap 42 also has a plurality of bottom end cap ribs 46 as shown in FIG. 5. The bottom end cap ribs 46 are arranged in a generally circular pattern with the end of each bottom end cap rib 46 aligned with the end of a longitudinal rib 38. As shown in FIG. 5, the outermost end of each bottom end cap rib 46 is located over a portion of metal plate 44 underlying the end of a longitudinal rib 38. As will be more fully described below, this alignment of the ends of the longitudinal ribs 38 and ribs 46 channels the flow of fluid around said first container 36. Bottom end cap ribs 46 extend radially toward the center 48 of said metal plate 44 of bottom end cap 42. As shown in FIG. 5, the bottom end cap ribs 46 do not extend all the way to said center 48. Thus, an open area near the center 48 of said metal plate 44 is formed through which fluid may flow. In the preferred embodiment of the invention metal plate 44 is made of copper and the bottom end cap ribs 46 are made of stainless steel.

Figure 3:
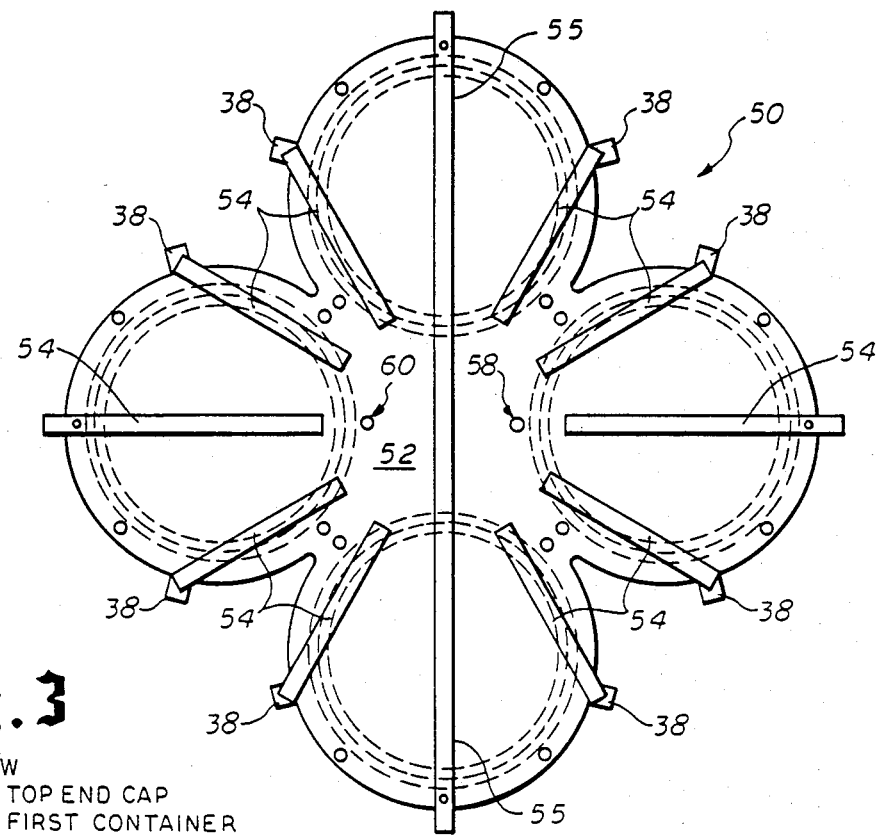
FIG. 3 is a top view of the top end cap of a first container showing the placement of metal ribs for directing the flow of fluid around said first container.

The top end of said body 34 of said first container 36 is sealed with a top end cap 50. The design of top end cap 50 is shown in FIG. 3. It may be seen that the construction of top end cap 50 is similar to that of bottom end cap 42 in that top end cap 50 generally comprises a metal plate 52 having a size and shape sufficient to cover the ends of the four tubes 32 of body 34 of first container 36. Top end cap 50 also has a plurality of top end cap ribs 54 radially disposed along the surface of metal plate 52. As in the case of the bottom end cap 42, each top end cap rib 54 has its outermost end aligned with a corresponding longitudinal rib 38. Also as in the case of bottom end cap 42, the metal plate 52 of top end cap 50 is made of copper and the top end cap ribs 54 are made of stainless steel.

Unlike bottom end cap 42, however, top end cap 50 has one top end cap rib 54 which extends all the way across the surface of metal plate 52 through the center 56 of said metal plate 52. This particular top end cap rib 54 will be referred to as the partition rib 55. A perspective view of the assembled first container 36 is shown in FIG. 6.

Figure 8:
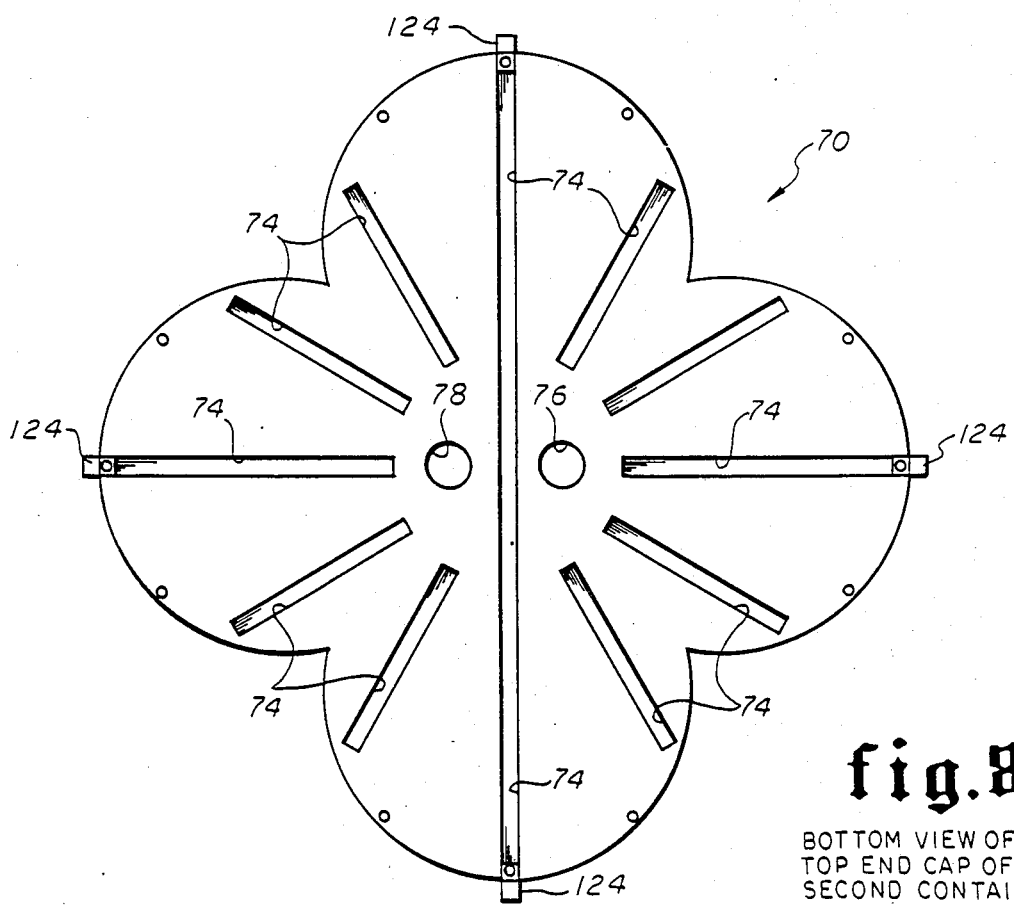
FIG. 8 is a bottom view of the top end cap of the second container for containing the first container showing grooves within the bottom of said top end cap for receiving metal ribs for directing the flow of fluid around said first container and showing the location of the entry port and exit port of the conduits leading to and from said first container.

The point 58 on top end cap 50 shown in FIG. 3 denotes the approximate location with respect to said first container 36 of an entry port 76 (as shown in FIGS. 2 and 8) through second container 40 when said first container 36 is contained within said second container 40 as depicted in FIG. 2. Similarly, the point 60 on top end cap 50 in FIG. 3 denotes the approximate location of an exit port 78 (as shown in FIGS. 2 and 8) through said second container 40 when said first container 36 is contained within said second container 40.

Because entry port 76 and exit port 78 are on opposite sides of partition rib 55, fluid flowing through entry port 76 into the space between first container 36 and second container 40 cannot flow directly toward exit port 78 but must first flow around first container 36. Specifically, the fluid passing through entry port 76 of said second container 40 will flow along the surface of metal plate 52 of top end cap 50 between the radially disposed top end cap ribs 54. The fluid will then flow down the length of the body 34 of said first container 36 between longitudinal ribs 38. Once the fluid reaches the bottom end cap 42 of said first container 36 the fluid will flow along the surface of metal plate 44 of bottom end cap 42 between the radially disposed bottom end cap ribs 46. The fluid will then pass through the central open portion at the center 48 of metal plate 44, through the bottom end cap ribs 46 and around and up the other side of said body 34 of said first container 36. The fluid will flow upwardly between said longitudinal ribs 38 until it reaches the surface of top end cap 50 once again.

The fluid will flow between the top end cap ribs 54 of top end cap 50 until the fluid reaches the exit port 78 at the approximate location 60 shown in FIG. 3. Partition rib 55 which extends all the way across the metal plate 52 through the center of metal plate 52 prevents the fluid from crossing the boundary defined by said partition rib 55. The configuration shown and described in the drawings insures that there will be an even distribution of fluid flow around said first container 36.

Figure 9:
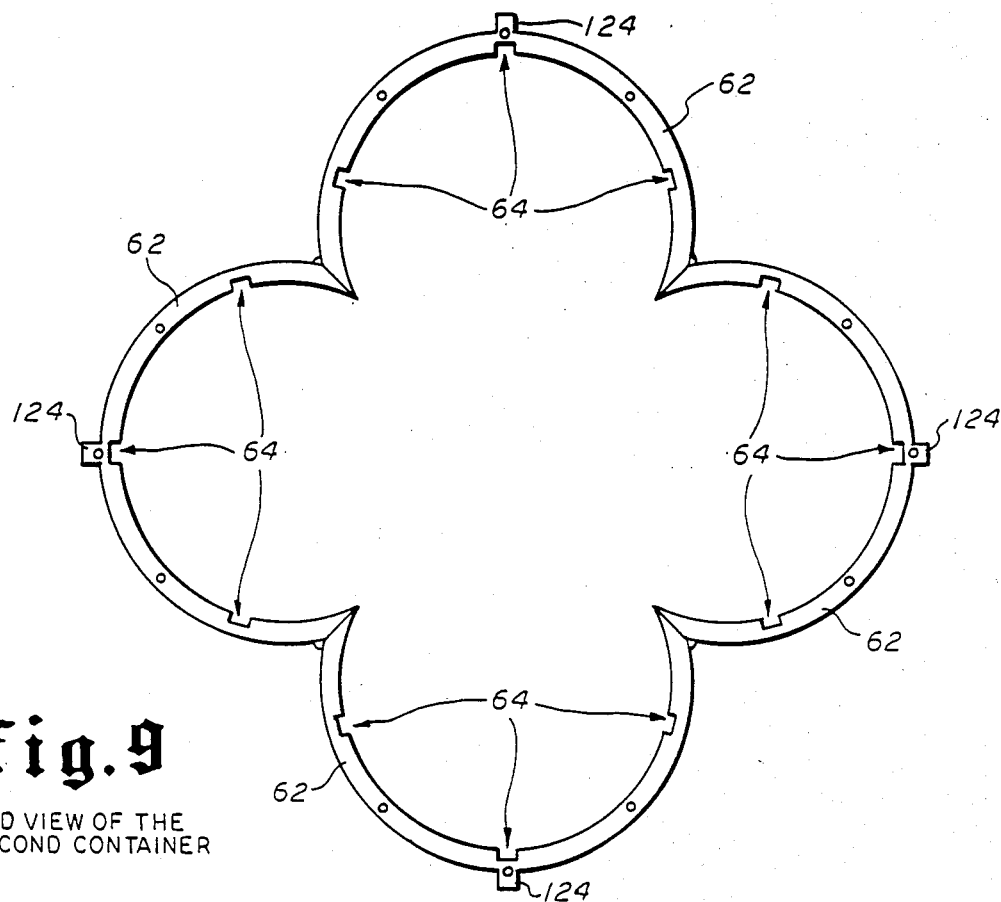
FIG. 9 is an end view of the second container for containing the first container.

Turning now to a description of second container 40, one sees with reference to FIGS. 2, 7, 8, 9 and 10 that second container 40 is generally configured for receiving first container 36 within its interior. Specifically, the body 62 of second container 40 as shown in FIG. 9 is constructed having grooves 64 for slidably receiving the longitudinal ribs 38 on the external surface of the body 34 of first container 36. Grooves 64 have a depth that is only one-half that of the corresponding dimensions of the longitudinal ribs 38 so that a cavity 66 (as shown in FIGS. 2 and 11) is formed between the body 34 of first container 36 and the body 62 of second container 40 when first container 36 is contained within second container 40. Fluid flowing around the sides of first container 36 flows through said cavity 66 formed between first container 36 and second container 40.

Figure 10:
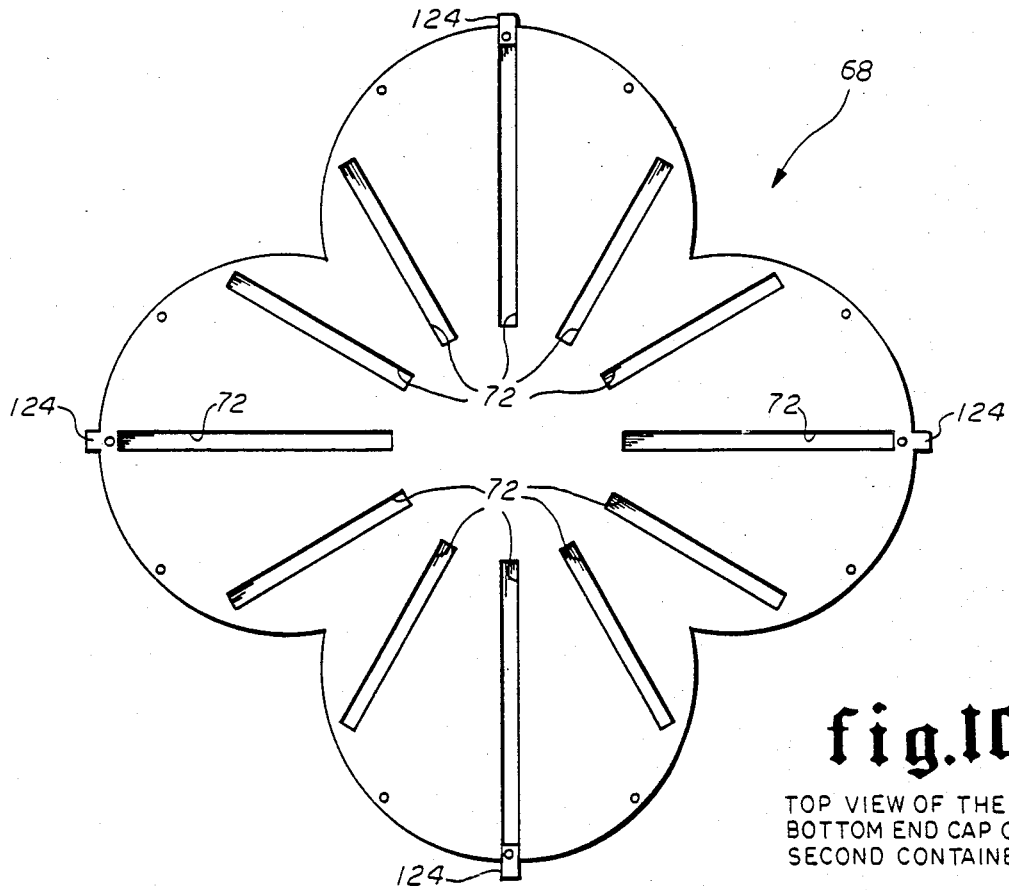
FIG. 10 is a top view of the bottom end cap of the second container for containing the first container showing grooves within the top of said bottom end cap for receiving metal ribs for directing the flow of fluid around said first container.

After first container 36 has been placed within the body 62 of second container 40, the bottom end cap 68 of second container 40 and the top end cap 70 of second container 40 are secured onto the ends of the body 62. As shown in FIG. 10, the top surface of bottom end cap 68 of second container 40 is formed with grooves 72 which receive the bottom end cap ribs 46 of first container 36. Similarly, as shown in FIG. 8, the bottom surface of top end cap 70 of second container 40 is formed with grooves 74 which receive the top end cap ribs 54 and partition rib 55 of first container 36.

Grooves 72 and grooves 74 are formed having a depth that is only one-half that of the corresponding dimension of their respective bottom end cap ribs 46 and top end cap ribs 54 and partition rib 55 of first container 36. The space formed between the two top end caps, 50 and 70, and the space formed between the two bottom end caps, 42 and 68, together with the space between the body 34 of first container 36 and the body 62 of second container 40 will be generally referred to as cavity 66.

As shown in FIG. 2, metal gaskets 75 are provided to seal the juncture between top end cap 70 and body 62 and the juncture between bottom end cap 68 and body 62 of second container 40. As shown in FIG. 2, metal gaskets 75 have apertures to accommodate the alignment pins 73 and bolts 77 (shown in dotted outline) connecting top end cap 70 and body 62 and connecting bottom end cap 68 and body 62.

Figure 7:
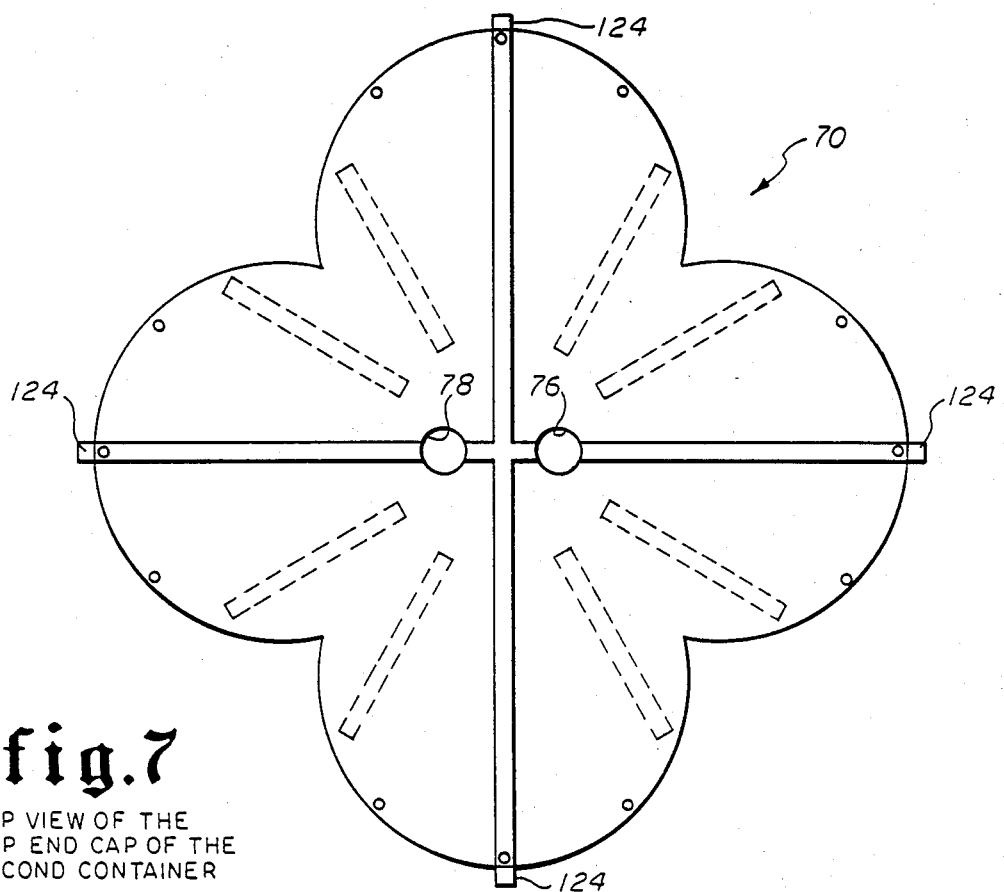
FIG. 7 is a top view of the top end cap of a second container for containing the first container showing the location of the entry port and exit port of the conduits leading to and from said first container.

As shown in FIGS. 7 and 8, top end cap 70 possesses an entry port 76 and an exit port 78. As shown in FIG. 21, fluid is carried to entry port 76 via a first conduit 80 and is carried from exit port 78 via a second conduit 82. As previously described, fluid entering entry port 76 circulates through cavity 66 and exits cavity 66 through exit port 78.

FIG. 11 shows the path the fluid takes in its flow around first container 36 in the cavity 66 between first container 36 and second container 40. FIG. 11 also shows a first coupling 84 for the connection of the first conduit 80 for transporting fluid to the cavity 66 formed between first container 36 and second container 40 when first container 36 is contained within second container 40. First conduit 80 is connected to entry port 76 within second container 40. As described above, the fluid flows around first container 36 through the cavity 66 formed between the exterior surfaces of first container 36 and the interior surfaces of second container 40. Also shown in FIG. 11 is a second coupling 86 for the connection of the second conduit 82 for transporting the fluid out of cavity 66 via exit port 78.

As shown schematically in FIG. 1, said first conduit 80 and said second conduit 82 are connected to pump means 88 for moving said fluid through said first conduit 80, through said cavity 66 between said first container 36 and said second container 40, through said second conduit 82, and through said pump means 88 and back into said first conduit 80 in a continuous closed loop of a fluid flow. Although depicted schematically in FIG. 1 as a block structure, pump means 88 actually comprises a complete pumping system including such elements as compressors, fluid reservoirs and the like necessary for pumping fluid through a closed loop of fluid flow. As long as pump means 88 continues to operate and circulate the fluid through the conduits and containers as described, a continual flow of fluid will exist around the exterior surface of first container 36 containing the stored material.

The monitoring equipment of the invention (omitted from FIG. 1 for clarity) is schematically depicted in FIG. 21. As shown in FIG. 21, means for monitoring said fluid to detect leakage of said material from said first container 36 may be connected within the closed loop comprising said first conduit 80, said cavity 66 between said first container 36 and said second container 40, said second conduit 82 and said pump means 88. If any material stored within first container 36 leaks into the cavity 66 the leaking material will be carried along by the fluid flowing out of cavity 66 and through second conduit 82. A material detector 90 connected within said closed loop of fluid flow can detect the presence of portions of the stored material within the circulating fluid.

Material detector 90 may take the form of any of a number of well known means for identifying chemical substances. Specifically, material detector 90 may be a gas chromtography analyzer, a liquid chromatography analyzer, an infrared analyzer, an ultraviolet analyzer, a nuclear magnetic resonance analyzer, or some other analyzer appropriate for identifying particular chemical substances.

In an alternative form of the invention material detector 90 is not connected within the closed loop of fluid flow. In this form of the invention a sample of the circulating fluid is removed from the closed loop of fluid flow via a valve or similar means. Said sample may then be taken to material detector 90 at an "offline" location for analysis to determine whether any portion of the stored material is present within the circulating fluid. The primary disadvantage of the "offline" method is that the monitoring process is not continuous. Monitoring and detection occurs only when fluid is removed from the closed loop of fluid flow for analysis.

In the preferred embodiment of the invention, the first conduit 80 and second conduit 82 extend from the bottom of storage cell 22 to the surface of the earth within which said storage cell is disposed and cemented. First conduit 80 and second conduit 82 are connected to pump means 88 at the surface. If material detector 90 is connected within said closed loop of fluid flow as described, it is also located at the surface. Generally, all equipment used to monitor the flow of fluid through the conduit system is located at the surface. Thus, the invention provides a means for conveying information to the surface concerning the status of the stored materials at the bottom of storage cell 22.

When the stored materials are radioactive, the material detector 90 may take the form of a radiation detector 92 capable of monitoring a radiation monitoring fluid moving through the closed loop comprising first conduit 80, cavity 66, second conduit 82 and pump means 88. The particular radiation detector 92 used in the preferred embodiment of the invention is a scintillation detector 94 and the particular radiation monitoring fluid used is a scintillation fluid. The scintillation fluid contains materials which will scintillate in the presence of radiation emitted by radioactive material. The scintillation fluid may be any of a number of well known preparations such as a xylene or toluene based fluid containing organic phosphors. The scintillation detectors 94 detects the presence of scintillation flashes of light caused by the presence of radioactive material within the circulating scintillation fluid.

First assume that the stored radioactive materials within first container 36 do not leak into cavity 66. Radiation from said stored materials will pass through the walls of said first container 36 and irradiate the scintillation fluid flowing through cavity 66 thereby causing the scintillating material within said scintillation fluid to give off flashes of scintillation light in the vicinity of first container 36. However, as the scintillation fluid flows toward the top of storage cell 22, the scintillating material is carried away from the radioactive radiation at the bottom of storage cell 22. The flashes of scintillation light induced by the exposure of scintillating material to radioactive radiation from the stored radioactive materials within first container 36 cease before the scintillating material reaches scintillation detector 94 at the top of storage cell 22. Because scintillation detector 94 is constructed to detect the presence of scintillations within the scintillation fluid as it passes through the scintillation detector 94, the scintillations induced by the radioactive material stored within first container 36 will not be detected. In this instance scintillation detector 94 would detect only a relatively small number of scintillation flashs of light caused by background radiation from the environment.

Now assume that radioactive material stored within first container 36 leaks out of said container into cavity 66. Said radioactive material will be carried along with said scintillation fluid to the top of said storage cell 22 where it will pass through said scintillation detector 94. In this instance, however, large numbers of scintillation flashes of light will be detected by scintillation detector 94 because the leaking radioactive materials will be present in the scintillation fluid as the scintillation fluid flows through said scintillation detector 94. In this manner leaking radioactive materials may be detected by scintillation detector 94 immediately upon the occurrence of leakage of radioactive material into the circulating scintillation fluid. If no radioactive material leaks into the scintillation fluid, only "background" scintillations will be detected and the scintillations induced by the radiation normally present in the stored radioactive material will not be detected by scintillation detector 94 because those scintillations cease once the scintillation fluid leaves the immediate area of first container 36 containing said materials.

Scintillation detector 94 may either be connected within the closed loop of fluid flow of the scintillation fluid or may be located "offline" outside the closed loop of fluid flow as previously noted in the description of material detector 90. In the latter case, a sample of scintillation fluid may be taken from the closed loop of fluid flow and transported to the "offline" scintillation detector 94 for analysis.

It will also be appreciated that use of the "offline" method permits the use of an inert, non-scintillation radiation monitoring fluid for carrying the leaked radioactive material through the closed loop of fluid flow. When a sample of inert non-scintilliation radiation monitoring fluid containing leaked radioactive material is taken from the closed loop of fluid flow for "offline" analysis, the leaked radioactive material may be detected by a geiger counter or other means for detecting radioactive radiation. With respect to the use of either a scintillation fluid or a non-scintillation fluid in the methods described above, it is seen that the use of a scintillation fluid is preferred when scintillation detector 94 is connected "online" within the closed loop of fluid flow. This is due to the fact that the scintillations in the fluid caused by the leaked radioactive material may be optically detected "online" as the scintillation fluid flows through scintillation detector 94 without the necessity of impeding the flow of scintillation fluid through the closed loop of fluid flow by removing a portion of the fluid for "offline" analysis.

Figure 22:
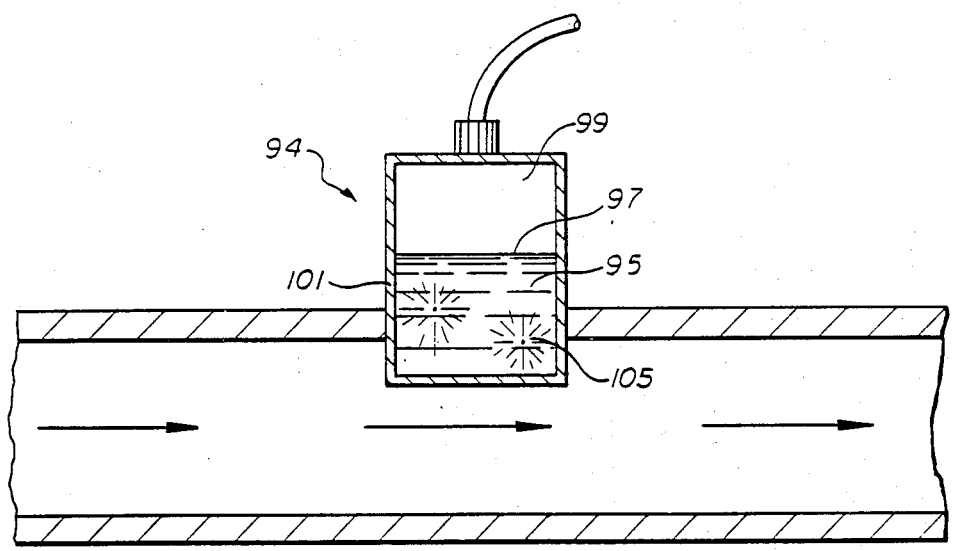
FIG. 22 is a vertical sectional view showing one form of a scintillation detector suitable for detecting the presence of leaked radioactive material in a closed loop of fluid flow of a non-scintillation radiation monitoring fluid.

It is possible, however, to use a scintillation detector 94 that employs a solid scintillator 95 in conjunction with an inert, non-scintillation radiation monitoring fluid to achieve an "online" monitoring for leaked radioactive material. As shown in FIG. 22, scintillation detector 94 comprises a solid scintillator 95 optically coupled through interface 97 to a photomultiplier section 99. The solid scintillator 95 may take the form of a thallium-activated sodium iodide crystal, NaI(Tl), as is well known in the scintillation detector art. The components of the scintillation detector 94 are enclosed within a sealed canister 101.

A portion of the sealed canister 101 containing solid scintillator 95 is placed within the closed loop of fluid flow so that the fluid may pass in close proximity to solid scintillator 95. If any leaked radioactive material is present in the inert, non-scintillation radiation monitoring fluid passing by solid scintillator 95, then the radiation from said radioactive material will pass through sealed canister 101 and will cause scintillation flashes of light 105 to occur in solid scintillator 95. These scintillation flashes of light may be optically detected through interface 97 and amplified in photomultiplier section 99 to generate a signal indicative of the presence of leaked radioactive material in the closed loop of fluid flow. Background radiation from the environment will cause a relatively small number of scintillation flashes of light 105 to always be present in solid scintillator 95. This phenomenon enables anyone monitoring the performance of scintillation detector 94 to determine whether it is functioning at any given time. Because the number of scintillation flashes of light 105 generated by the presence of leaked radioactive material in the closed loop of fluid flow is so much greater than the number of scintillation flashes of light generated by the background radiation, it is possible to detect the presence of radioactive material in the closed loop of fluid flow. This embodiment of scintillation detector 94 permits one to use a relatively inexpensive non-scintillation radiation monitoring fluid to achieve the preferred "online" monitoring for leaked radioactive materials previously attainable only by using the more costly scintillation fluid method.

When the material detector 90 (or radiation detector 92 in the case of radioactive materials) is located within the closed loop of fluid flow, means are provided for immediately determining when material detector 90 (or radiation detector 92) detects the presence of stored material in the fluid flowing through the closed loop comprising first conduit 80, cavity 66, second conduit 82 and pump means 88. Said means generally comprises a computer 96 having at least one input line connected to said material detector 90 (or radiation detector 92) for transmitting a signal to computer 96 when material detector 90 (or radiation detector 92) detects the presence of material in the fluid. Computer 96 frequently monitors material detector 90 (or radiation detector 92) over said input line to detect a signal signifying the presence of stored material in the fluid.

When computer 96 detects the signal indicating the presence of stored material in the fluid, it may sound an alarm to alert the operator of the storage facility that a leakage condition has occurred. In this manner, any leakage of stored material may be detected within an extremely short amount of time. The use of "fault tolerant" computer systems and frequency operational validity tests on the detecting equipment can insure a very high level of reliability in the monitoring process.

In addition, computer 96 may be programmed to provide different levels of notification to the operator of the storage facility concerning the status of the stored materials being monitored. Not all changes in the status of the monitoring system would require an alarm to be sounded. For example, detection of a decrease in the rate of fluid flow would not necessarily require that an alarm be sounded. Computer 96 could bring the matter to the attention of the operator of the storage facility via well known display means such as a printer or cathode ray tube display. Computer 96 could also be programmed to take immediate corrective action itself such as automatically switching on a back-up pumping system in the event that a pumping system failure was detected.

Although the preferred embodiment of the invention utilizes a computer 96, it is seen that a non-programmable "hard-wired" electronic circuit could be devised to perform the functions of the computer 96 in the monitoring system. The use of computer 96 is preferable because it gives the added flexibility of being able to read, store and retrieve data concerning the various parameters in the monitoring system. Computer 96 can also correlate said data and notify the operator of the storage facility when certain long range trends are detected. For example, computer 96 can store temperature data received from a temperature measuring device which determines the temperature of the monitoring fluid and can compare the values of temperature taken over a period of time to detect an otherside unnoticeable gradual increase or decrease in the temperature of the monitoring fluid.

Turning once again to the description of the monitoring system, one notes that it is important to be able to determine whether the fluid circulating between first container 36 and second container 40 is leaking out of the closed loop of fluid flow. For example, assume that first conduit 80 developed a leak which permitted the fluid to leak out of first conduit 80 into the storage cell 22. After the fluid level had decreased sufficiently, it would become impossible for material detector 90 (or radiation detector 92) to operate correctly. Such a fluid leak would make it impossible to determine whether the material stored within first container 36 was leaking.

The problem may be resolved by providing a volume measuring unit 98 (as shown in FIG. 21) within the closed loop comprising first conduit 80, cavity 66 between first container 36 and second container 40, second conduit 82 and pump means 88 for measuring the changes in the volume of the fluid flowing through said closed loop. Computer 96 may be connected to said volume measuring unit 98 via at least one input line connected to said volume measuring unit 98 for transmitting a signal to said computer 96 when said volume measuring unit 98 detects a change in the volume of said fluid. As in the case of material detector 90 (or radiation detector 92), computer 96 frequency monitors said input line to detect a signal indicative of volume measuring unit 98 having detected a change in the vollume of said fluid. Computer 96 correlates the receipt of said signal with other information it possesses in the manner previously described and determines the appropriate response to be made. If necessary, computer 96 can sound an alarm immediately notifying the operator of the storage facility of the detected change in the volume of the fluid.

One other problem that may arise in the maintenance of a continual fluid flow around the stored material within first container 36 is that of detecting changes in the rate of fluid flow. Assume that pump means 88 malfunctioned in such a manner that the rate of fluid flow through the closed loop was either greatly diminished or stopped entirely. Because a storage facility utilizing the method and apparatus of the present invention would likely comprise several storage cells, the operator of such a facility might not notice when a particular pump means 88 malfunctioned. Although no leakage of fluid would occur from the closed loop of fluid flow, the detection system would no longer operate correctly if the rate of fluid flow were significantly diminished or stopped. Accordingly, the apparatus of said invention is provided with means for detecting a change in the rate of flow of the fluid flowing through the closed loop. Said means comprise a flowmeter 100 (as shown in FIG. 21) connected within the closed loop for measuring the rate of flow of fluid flowing through the closed loop together with means for determining when flowmeter 100 detects a change in the rate of flow of said fluid flowing through the closed loop.

Computer 96 may once again be used to provide the means for determining when flowmeter 100 detects a change in the rate of fluid flow. Specifically, computer 96 may be connected to flowmeter 100 with at least one input line for transmitting a signal to computer 96 indicative of the detection by flowmeter 100 of a change in the rate of flow of the fluid flowing through the closed loop. As before computer 96 may be used to determine the appropriate response including the sounding of an alarm alerting the operator of the storage facility when computer 96 determines that flowmeter 100 has detected a change in the rate of fluid flow.

Certain stored materials give off a considerable amount of heat. This is especially true in the case of radioactive materials. When radioactive materials or other heat generating materials are stored, it may become necessary to cool the fluid which flows through the closed loop. Accordingly, the apparatus of the present invention may be provided with means connected within first conduit 80, cavity 66 between first container 36 and second container 40, second container 82 and pump means 88 for cooling the fluid as the fluid flows through said closed loop. Said means may comprise any of a number of conventional means including a heat exchanger 102 as depicted in FIG. 21.

A temperature measuring device 103 (FIG. 21) may be placed into thermal contact with the fluid flowing through the closed loop in order to monitor the fluid's temperature and thereby indirectly gain knowledge of the temperature of the stored materials. As before, computer 96 may be connected to temperature measuring device 103 with at least one input line for transmitting a signal to computer 96 indicative of the temperature of the fluid being measured by temperature measuring device 103. Computer 96 can then compare said signal on said input line with other signals previously stored in computer 96 which are indicative of a predetermined range of temperatures to determine whether the temperature of the fluid is within said predetermined range of temperatures. Computer 96 may then be used to determine the appropriate response including the sounding of an alarm alerting the operator of the storage facility when computer 96 determines that the temperature of the fluid is outside the predetermined range of temperatures. In order to obtain an accurate temperature measurement, temperature measuring device 103 should be placed within the closed loop between the set of nested containers 20 and heat exchanger 102 as shown in FIG. 21 so that the fluid is not cooled before the temperature measurement is taken. Of course, it is also possible to place an additional temperature measuring device after heat exchanger 102 in the closed loop of fluid flow in order to verify that heat exchanger 102 is operating properly.

The apparatus of the present invention may also be used to detect the migration of fluids into the stored materials within first container 36 from outside of second container 40. When materials are stored underground, it is very common for water to migrate into the stored materials thereby dissolving and carrying away soluble portions of the stored materials. This is very undesirable if the stored materials are hazardous materials. For example, stored water-soluble toxic chemicals may be carried away by the migration of ground water and eventually find their way into the fresh water supply of communities. The apparatus of the present invention provides a means for detecting the migration of an external fluid into the fluid flowing between first container 36 and second container 40. The fluid flowing between first container 36 and second container 40 will be referred to as the first fluid. The external fluid outside of second container 40 (usually water) will be referred to as the second fluid.

The general structure of the apparatus of the invention is as has been previously described. However, in this application, the chemical composition of the first fluid differs from that of the second fluid. In a specific example, assume that the second fluid to be detected is water. The first fluid is a scintillation fluid containing a known small amount of water in it. If water external to second container 40 manages to permeate or leak through said second container 40 and enter cavity 66, it will mix with the scintillation fluid flowing through the closed loop of fluid flow thereby causing the amount of water in the scintillation fluid to increase with respect to the previously known level of water in the scintillation fluid.

The scintillation fluid carrying the extra amount of invading water will travel up to the detecting equipment on the surface via second conduit 82 where it will pass through a second fluid detector 104 for detecting the presence of a second fluid (here water) in the first fluid (here scintillation fluid) flowing through said closed loop of fluid flow. In this embodiment of the invention, second fluid detector 104 would replace and be used in lieu of material detector 90 within the closed loop of fluid flow. As previously described, computer 96 monitors an input line connected to said second fluid detector 104 and can notify the storage facility operator when said second fluid detector 104 detects the presence of water in the scintillation fluid in amounts that are greater than normally expected. Of course, when the invading second fluid to be detected is not water but is some other fluid, an appropriate second fluid detector 104 is chosen for detecting the specific second fluid involved.

The elements of the apparatus previously described including specifically the volume measuring unit 98, the flowmeter 100, the heat exchanger 102 and the temperature measuring device 103 may all be used in conjunction with the second fluid detector 104. It should be noted that second fluid detector 104 may also be used in an "offline" manner as previously described in connection with other types of detectors. Of course, the "online" method utilizing computer 96 for continuous monitoring is preferable when the immediate detection of the invasion of the second fluid is desired. The "offline" method would provide information concerning the presence of the second fluid only when the manually conducted "offline" tests were performed.

The apparatus of the present invention thus provides a means for immediately notifying the operator of a storage facility when a second fluid such as water has invaded or migrated into the cavity 66 between first container 36 and second container 40. Of course, the occurrence of any leakage or migration of said second fluid into said cavity 66 may be immediately remedied by raising the containers 36 and 40 from the bottom of storage cell 22 and effecting immediate repairs.

In addition to detecting leakage or migration of a second fluid into cavity 66, the first fluid may also simultaneously be used to detect the leakage of the stored material from first container 36 into cavity 66 as previously described. In this embodiment of the invention, second fluid detector 104 would be placed in series with and used in addition to material detector 90 within the closed loop of fluid flow. The continual flow of first fluid through the closed loop comprising first conduit 80, cavity 66, second conduit 82 and pump means 88 would carry any stored material that has leaked into cavity 66 from first container 36 to material detector 90 and would simultaneously carry to second fluid detector 104 any second fluid which is leaked into the closed loop of fluid flow.

It is possible to use a non-water-based scintillation fluid such as xylene or toluene as the first fluid in such an arrangement. Examples of commercially available preparations of such scintillation fluids include Insta-Gel, Insta-Fluor and Filter Count (the foregoing names are all registered trademarks of United Technologies Corporation). Such scintillation fluids, in addition to serving in the capacity of a scintillation fluid as previously described, can simultaneously serve as a first fluid for transporting to a second fluid detector 104 any second fluid that leaked or migrated into the closed loop of fluid flow.

Figure 20:
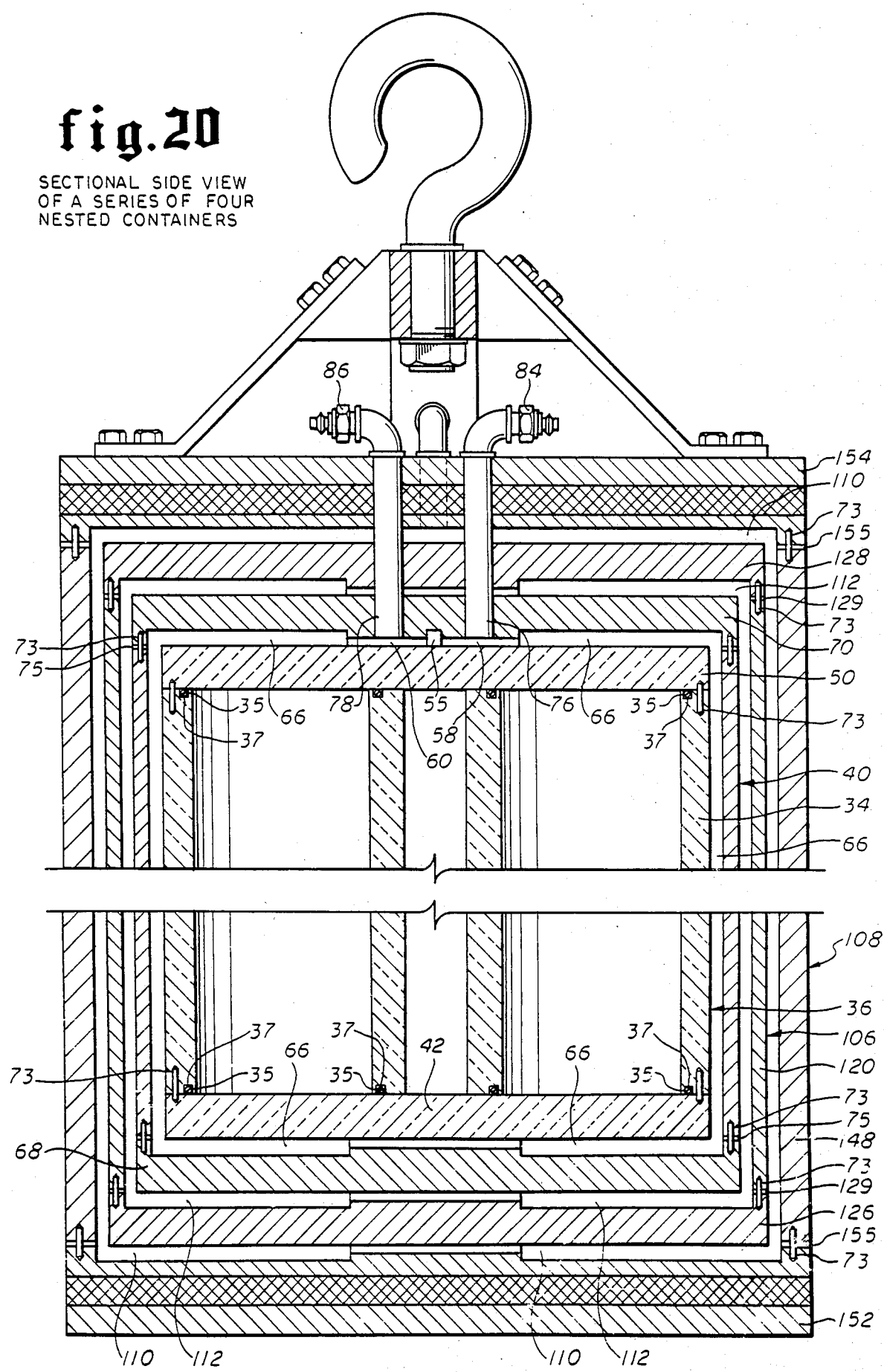
FIG. 20 is a vertical sectional side view of a series of four nested containers showing the nesting of the containers and showing the connection of conduits for transporting fluids to cavities between said nested containers.

Although it is possible to detect leakage of stored material from first container 36 and to detect leakage of a second fluid into the closed loop of fluid flow using only a single fluid circulating throughout said closed loop of fluid flow, for reasons to be described more fully below the preferred method involves the separation of the two detection processes. Accordingly, the preferred embodiment of the apparatus comprises a third container 106 for containing second container 40 and a fourth container 108 for containing third container 106 as depicted in FIG. 20. Third container 106 and fourth container 108 are constructed in a manner similar to that previously described for first container 36 and second container 40. As shown in FIG. 20, a cavity 110 is formed between third container 106 and fourth container 108 when third container 106 is contained within fourth container 108. When second container 40 is contained within third container 106, a dead air space 112 is formed.

In this embodiment of the apparatus utilizing four containers, a second closed loop of fluid flow exists as depicted in FIG. 21 comprising third conduit 114, cavity 110 (FIG. 20), fourth conduit 116 and pump means 118. The detection of leakage or migration of an external third fluid into the nested container 20 will be monitored by a second fluid circulating between third container 106 and fourth container 108 in said second closed loop of fluid flow. The previously described first closed loop of fluid flow of first fluid between first container 36 and second container 40 now serves solely to detect leakage of stored material from first container 36.

A primary reason for using two closed loops of fluid flow each with its own circulating fluid is to increase the detection efficiency of the monitoring system. Specifically, it has been determined that the task of carrying material performed by the first fluid in the innermost closed loop of fluid flow requires a fluid having different rheological or flow properties than the second fluid flowing in the outermost closed loop of fluid flow. One desires that the first fluid have a great capacity for carrying solid material. Accordingly, one desires that said fluid have thixotropic qualities. A thixotropic fluid is one that will tend to thicken or "gel" if it ceases to flow and is left to stand. The optimal choide of a first fluid would be an aliphatic fluid such as kerosene or diesel containing a thixotropic agent such as a bentone.

Conversely, because the task to be performed by the second fluid flowing in the outermost closed loop of fluid flow is to dissolve and disperse an external fluid (usually water) it should have no thixotropic agent in it. A suitable second fluid for use in the apparatus of the invention would be an aliphatic fluid such as kerosene or diesel containing no thixotropic agent. Thus, it may be seen that the utilization of two closed loops of fluid flow contributes to the efficiency of the detection process in providing fluids specifically chosen for the tasks which they must perform. Additionally, the use of four containers instead of two containers adds to and improves the security and integrity of the stored materials within the innermost nested container.

Figure 13:
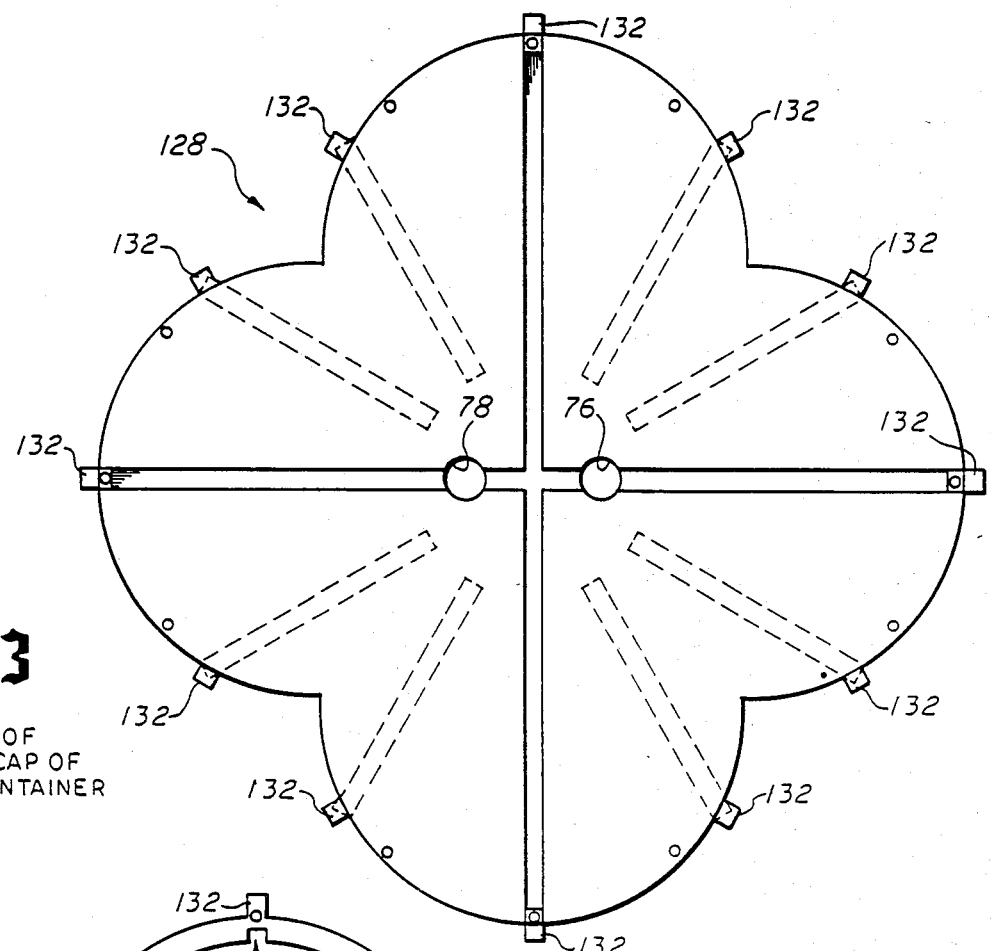
FIG. 13 is a bottom view of the top end cap of the third container for containing the second container showing metal ribs for positioning said second container within said third container and showing the entry port and the exit port for conduits leading to and from said second container.
Figure 14:
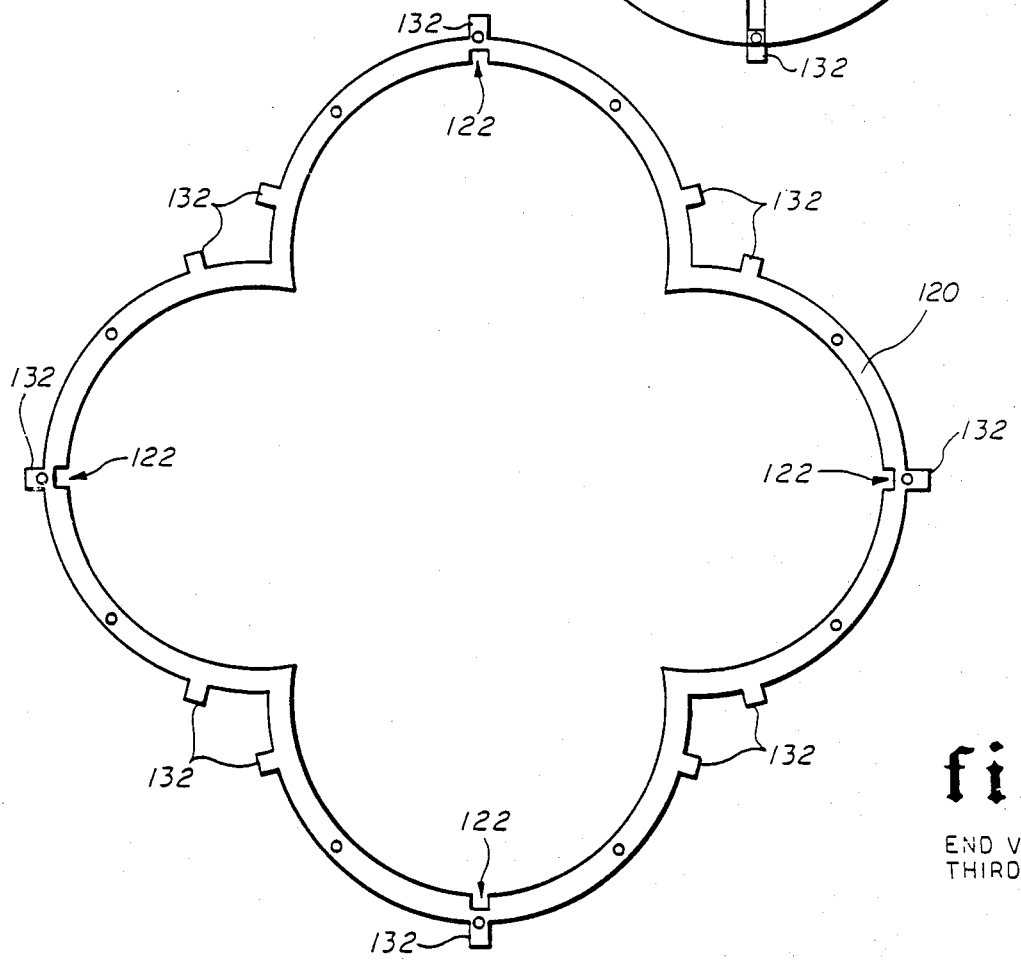
FIG. 14 is an end view of the third container for containing the second container.

Turning now to a description of third container 106, one sees with reference to FIGS. 12, 13, 14, 15, 16 and 20 that third container 106 is generally configured for receiving second container 40 within its interior. Specifically, the body 120 of third container 106 as shown in FIG. 14 is constructed having grooves 122 for slidably receiving longitudinal ribs 124 on the external surface of second container 40 as shown in FIGS. 7, 8, 9 and 10. Grooves 122 have a depth that is only one-half that of the corresponding dimension of the longitudinal ribs 124 so that a dead air space 112 (FIG. 20) is formed between the body 120 of third container 106 and the body 62 of second container 40 when second container 40 is contained within third container 106.

After second container 40 has been placed within the body 120 of third container 106, the bottom end cap 126 of third container 106 and the top end cap 128 of third container 106 is secured onto the ends of the body 120. As shown in FIG. 20, metal gaskets 129 are provided to seal the juncture between top end cap 128 and body 120 and the juncture between bottom end cap 126 and body 120 of third container 106. As in the case of metal gaskets 75, metal gaskets 129 have apertures to accommodate alignment pins 73 (FIG. 20) and bolts (not shown) connecting top end cap 128 and body 120 and connecting bottom end cap 126 and body 120.

Figure 15:
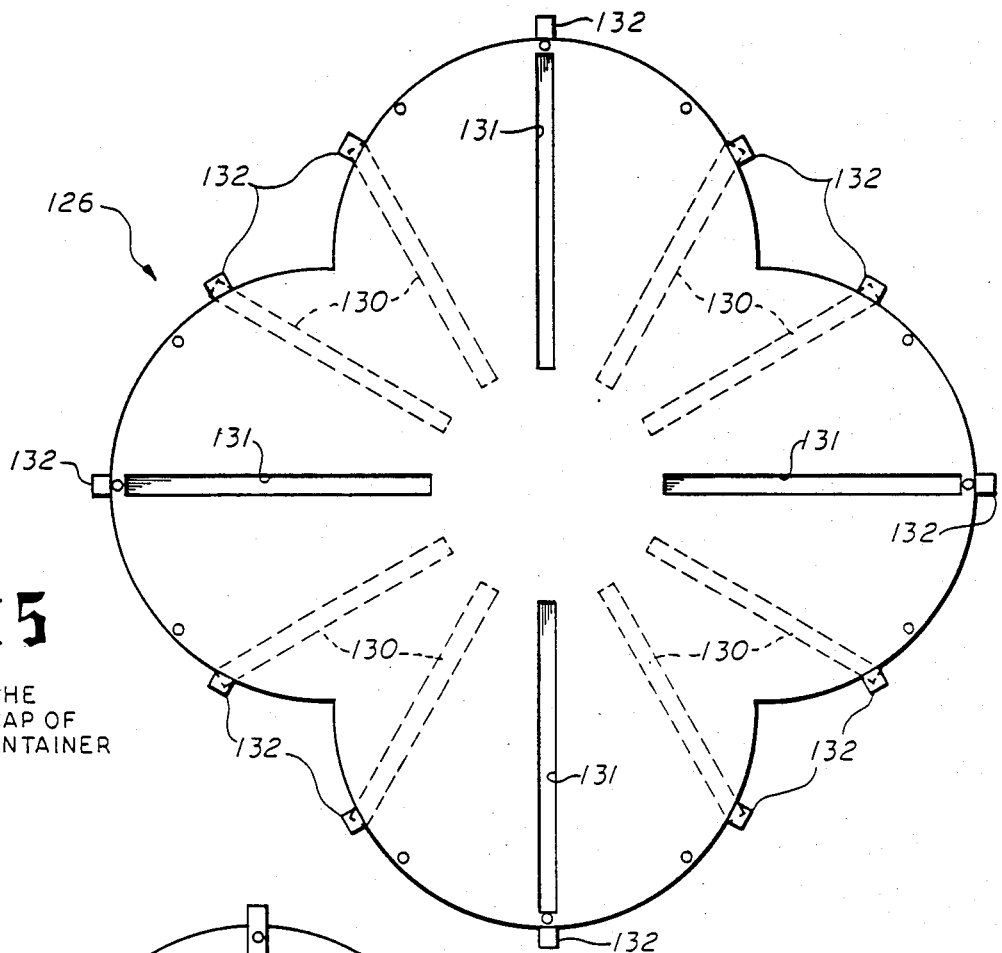
FIG. 15 is a top view of the bottom end cap of the third container for containing the second container showing grooves for receiving metal ribs to position said second container within said third container.
Figure 16:
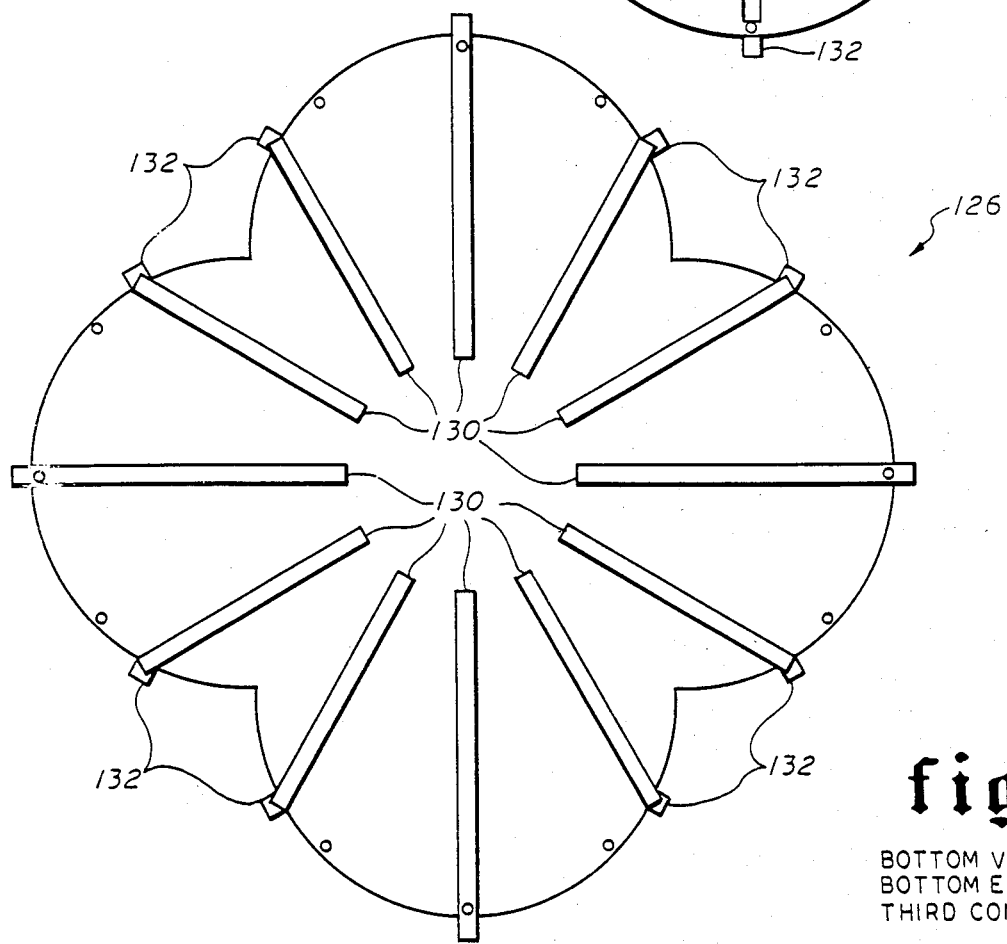
FIG. 16 is a bottom view of the bottom end cap of the third container for containing the second container showing the placement of metal ribs for directing the flow of fluid around said third container.

As shown in FIGS. 15 and 16, bottom end cap 126 has a plurality of bottom end cap ribs 130 on its bottom side and a plurality of grooves 131 on its top side. The bottom end cap ribs 130 are arranged in a generally circular pattern with the end of each bottom end cap rib 130 aligned with the end of a rib 132 of body 120 of third container 106 as shown in FIG. 14. In a manner similar to that described in the case of first container 36 and second container 40, this alignment of the ends of ribs 130 and ribs 132 channels the flow of fluid around third container 106. Also in a manner similar to that described in the case of first container 36 and second container 40, bottom end cap ribs 130 extend radially toward the center of bottom end cap 126. As shown in FIG. 16, the bottom end cap ribs 130 do not extend all the way to the center of bottom end cap 126 in order that an open area may be formed through which fluid may flow around third container 106. The grooves 131 in the top of bottom end cap 126 receive correspondingly positioned ribs of second container 40 to correctly position second container 40 within third container 106.

The top end of body 120 of third container 106 is sealed with a top end cap 128. The design of top end cap 128 is shown in FIGS. 12 and 13. Top end cap 128 has a plurality of top end cap ribs 134 radially disposed and aligned with a corresponding longitudinal rib 132 of body 120 as previously described. Also in a manner similar to the design previously described for first container 36 and second container 40, top end cap 128 has a particular top end cap rib 134 which extends all the way across said top end cap 128 to function as a partition rib 136. Top end cap 128 has apertures for entry port 76 and exit port 78 as shown in FIGS. 12 and 13.

The point 140 on top end cap 128 shown in FIG. 12 denotes the approximate location with respect to third container 106 of an entry port 144 through fourth container 108 when third container 106 is contained within fourth container 108. Similarly, the point 142 on top end cap 128 in FIG. 12 denotes the approximate location of an exit port 146 through fourth container 108 when third container 106 is contained within fourth container 108.

Because entry port 144 and exit port 146 are on opposite sides of partition rib 136, fluid flowing through entry port 144 into the space between third container 106 and fourth container 108 cannot flow directly toward exit port 146 but must first flow around third container 106. Specifically, the fluid passing through entry port 144 of fourth container 108 will flow along the surface of top end cap 128 between the radially disposed top end cap ribs 134. The fluid will then flow down the length of the body 120 of third container 106 between longitudinal ribs 132. Once the fluid reaches the bottom end cap 126 of third container 106 the fluid will flow along the surface of bottom end cap 126 between the radially disposed bottom end cap ribs 130. The fluid will then pass through the central open portion at the center of bottom end cap 126 and around and up the other side of said body 120 of third container 106. The fluid will flow upwardly between longitudinal ribs 132 until it reaches the surface of top end cap 128 once again. The fluid will flow between the top end cap ribs 134 of top end cap 128 until the fluid reaches the exit port 146 at the approximate location 142 shown in FIG. 12. Partition rib 136 which extends all the way across and through the center of top end cap 128 (except for entry port 76 and exit port 78) prevents the fluid from crossing the boundary defined by said partition rib 136. The configuration shown and described in the drawings insures that there will be an even distribution of fluid flow around said third container 106.

Turning now to a description of the fourth container 108, one sees with reference to FIGS. 17, 18, 19 and 20 that fourth container 108 is generally configured for receiving third container 106 within its interior. Specifically, the body 148 of fourth container 108 as shown in FIG. 18 is constructed having grooves 150 for slidably receiving the longitudinal ribs 132 on the external surface of the body 120 of third container 106. Grooves 150 have a depth that is only one-half that of the corresponding dimension of the longitudinal ribs 132 so that a cavity 110 (as shown in FIG. 20) is formed between the body 120 of third container 106 and the body 148 of fourth container 108 when said third container 106 is contained within fourth container 108. Fluid flowing around the sides of third container 106 flows through said cavity 110 formed between third container 106 and fourth container 108.

Figure 19:
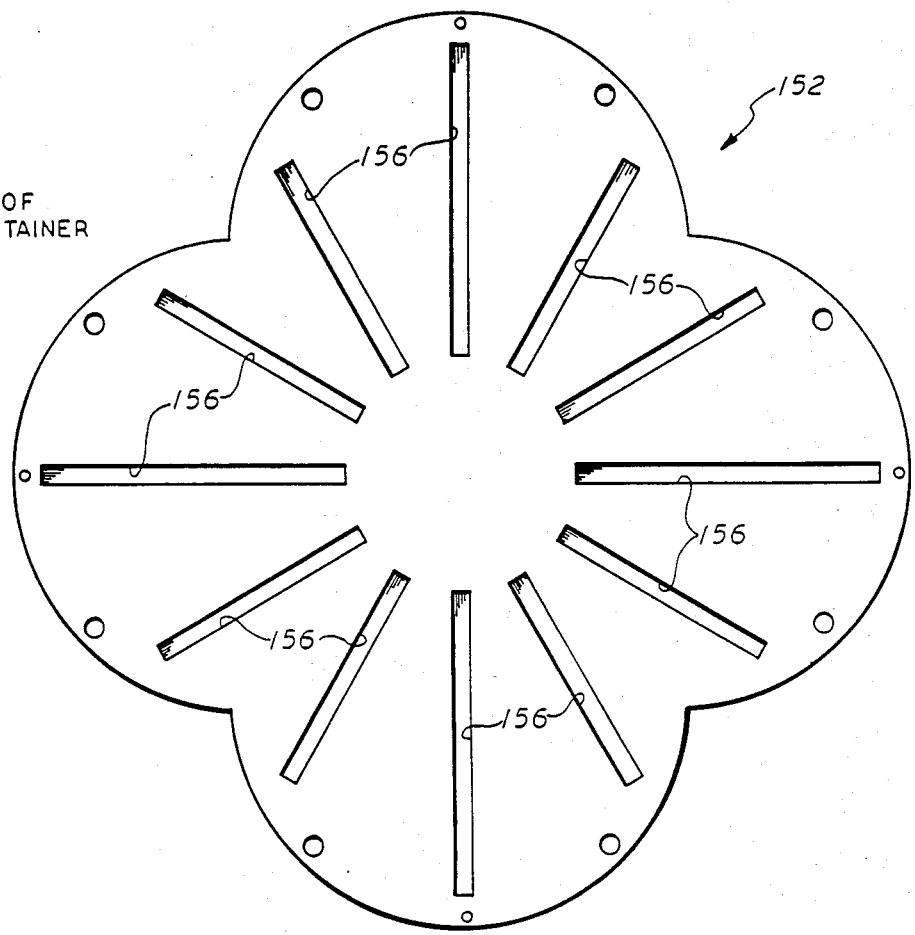
FIG. 19 is a top view of the bottom end cap of the fourth container for containing the third container showing grooves within the top of said bottom end cap for receiving metal ribs for directing the flow of fluid around said third container.

After third container 106 has been placed within the body 148 of fourth container 108, the bottom end cap 152 of fourth container 108 and the top end cap 154 of fourth container 108 are secured onto the ends of the body 148. As shown in FIG. 20, metal gaskets 155 are provided to seal the juncture between top end cap 154 and body 148 and the juncture between bottom end cap 152 and body 148 of fourth container 108. As before, metal gaskets 155 have apertures to accommodate alignment pins 73 (FIG. 20) and bolts (not shown) connecting top end cap 154 and body 148 and connecting bottom end cap 152 and body 148. As shown in FIG. 19, the top surface of bottom end cap 152 of fourth container 108 is formed with grooves 156 which receive the bottom end cap ribs 130 of third container 106. Similarly, as shown in FIG. 17, the bottom surface of top end cap 154 of fourth container 108 is formed with grooves 158 which receive the top end cap ribs 134 and partition rib 136 of third container 106.

Grooves 156 and grooves 158 are formed having a depth that is only one-half of the corresponding dimensions of their respective bottom end cap ribs 130 and top end cap ribs 134 and partition rib 136 of third container 106. The space formed between the two top end caps, 128 and 154, and the space formed between the two bottom end caps, 126 and 152, together with the space between the body 120 of third container 106 and the body 148 of fourth container 108 will be generally referred to as cavity 110 (FIG. 20).

As shown in FIG. 17, top end cap 154 has an entry port 144 and an exit port 146 in addition to an entry port 76 and an exit port 78. As shown in FIG. 21, fluid is carried to entry port 144 via a third conduit 114 and is carried from exit port 146 via a fourth conduit 116. As previously described, fluid entering entry port 144 circulates through cavity 110 and exits cavity 110 through exit port 146.

Turning now to the previously mentioned dead air space 112 shown in FIG. 20, one sees that under normal circumstances there is no fluid in dead air space 112. Fluid will generally be present in dead air space 112 only when said fluid leaks into dead air space 112 from cavity 66 or from cavity 110. Thus, in addition to providing additional insulation of the stored material from the environment, dead air space 112 provides a "pocket" into which fluid leaking from either cavity 66 or cavity 110 may flow so that any such leak may be immediately detected due to the significant decrease in volume of fluid in the closed loop of fluid flow in which the leak into dead air space 112 occurred.

In this connection, it should be noted that it is possible to contain a gas under pressure within dead air space 112 via a conduit (not shown) connecting said dead air space 112 to a source of pressurized gas. The preferred location for said source of pressurized gas and associated gas pressure monitoring equipment would be outside of storage cell 22 next to the other monitoring equipment such as material detector 90 shown in FIG. 21. If the gas pressure within dead air space 112 was ever seen to fall from the expected level of gas pressure, the presence of a leak within dead air space 112 (or its associated conduit) could be detected. The arrangement described above permits the early detection of very small leaks within the inner surface of cavity 110 or within the outer surface of cavity 66.

Although in ordinary circumstances the monitoring fluids used to practice the invention will be liquids, it is possible to use a gas under pressure for each of the previously described monitoring fluids in the closed loops of fluid flow. Because both gases and liquids are fluids as contemplated in the definition of the term "fluid" it is clear that the apparatus and method of the invention may utilize either gases or liquids in performing the task of monitoring stored material.

Other types of storage cells 22 for storing the nested containers 20 may be devised. For example, if one desires to store and monitor more than one set of nested containers, storage cell 22 may take the form of a reinforced concrete trench (not shown) for containing a plurality of sets of nested containers immersed in a volume of water. In such an embodiment each set of nested containers could be disposed within said trench and located at various positions along the length of said trench. Further, each set of nested containers could be located at any desired distance from each of the two neighboring sets of nested containers. The opposite walls of said trench would be strengthened and braced with steel beams transversely disposed to and anchored within the surfaces of said walls. The water used to fill said trench would provide a heat sink having a greater capacity than that provided by the water filling a storage cell for a single set of nested containers.

Although a specific preferred embodiment of the invention has been described it is to be understood that modifications may be made in the disclosed preferred embodiment without departing from the true spirit and scope of the invention.

What is claimed is:

1. A storage system for the monitored storage of non-radioactive hazardous material comprising
   a first container for containing non-radioactive hazardous material;
   a second container for containing said first container;
   means for circulating a monitoring fluid in a closed loop of fluid flow through a cavity between said first container and said second container when said first container is contained within said second container, said closed loop of fluid flow through said cavity covering substantially the entire exterior surface of said first container;
   means located within said closed loop of fluid flow for monitoring said monitoring fluid to detect leakage of said non-radioactive hazardous material from said first container;
   means for monitoring said monitoring fluid to detect when the volume of said monitoring fluid in said closed loop of fluid flow is not within a predetermined range of volumes; and
   means for monitoring said monitoring fluid to detect when the rate of flow of said monitoring fluid is not within a predetermined range of rates of flow.

2. A storage system for the monitored storage of non-radioactive hazardous material comprising
   a first container for containing non-radioactive hazardous material;
   a second container for containing said first container;
   a first conduit for transporting a monitoring fluid to a cavity between said first container and said second container when said first container is contained within said second container;
   a second conduit for transporting said monitoring fluid from said cavity between said first container and said second container;
   pump means connecting said first conduit and said second conduit for moving said monitoring fluid through said first conduit, through said cavity between said first container and said second container, through second conduit, through said pump means and back into said first conduit in a continuous closed loop of fluid flow, said closed loop of fluid flow through said cavity covering substantially the entire exterior surface of said first container;
   a non-radioactive hazardous material detector located within said closed loop of fluid flow for measuring the level of non-radioactive hazardous material present in said monitoring fluid flowing through said closed loop of fluid flow;
   means for determining when said non-radioactive hazardous material detector detects the presence of a level of non-radioactive hazardous material in said monitoring fluid flowing through said closed loop of fluid flow that is not within a predetermined range of levels of non-radioactive hazardous material due to leakage of said non-radioactive hazardous material from said first container;
   means for monitoring said monitoring fluid to detect when the volume of said monitoring fluid in said closed loop of fluid flow is not within a predetermined range of volumes; and means for monitoring said monitoring fluid to detect when the rate of flow of said monitoring fluid is not within a predetermined range of rates of flow.

3. A storage system for the monitored retrievable storage of non-radioactive hazardous material comprising
a first container for containing non-radioactive hazardous material;
a second container for containing said first container;
a storage cell containing said second container;
means for circulating a monitoring fluid in a closed loop of fluid flow through a cavity between said first container and said second container when said first container is contained within said second container, said closed loop of fluid flow through said cavity covering substantially the entire exterior surface of said first container;
means located within said closed loop of fluid flow for monitoring said monitoring fluid to detect leakage of said non-radioactive hazardous material from said first container;
means for monitoring said monitoring fluid to detect when the volume of said monitoring fluid in said closed loop of fluid flow is not within a predetermined range of volumes;
means for monitoring said monitoring fluid to detect when the rate of flow of said monitoring fluid is not within a predetermined range of rates of flow; and
means for retrieving said second container and said first container from said storage cell when leakage of said non-radioactive hazardous material from said first container is detected.

4. A storage system for the monitored retrievable storage of non-radioactive hazardous material comprising
a first container for containing non-radioactive hazardous material;
a second container for containing said first container;
a storage cell containing said second container;
a first conduit for transporting a monitoring fluid to a cavity between said first container and said second container when said first container is contained within said second container;
a second conduit for transporting said monitoring fluid from said cavity between said first container and said second container;
pump means connecting said first conduit and said second conduit for moving said monitoring fluid through said first conduit, through said cavity between said first container and said second container, through said second conduit in a continuous closed loop of fluid flow, said closed loop of fluid flow through said cavity covering substantially the entire exterior surface of said first container;
a detector located within said closed loop of fluid flow for measuring the level of non-radioactive hazardous material present in said monitoring fluid flowing through said closed loop of fluid flow;
means for determining when said detector detects the presence of a level of non-radioactive hazardous material in said monitoring fluid flowing through said closed loop of fluid flow that is not within a predetermined range of levels of non-radioactive hazardous material due to leakage of said non-radioactive hazardous material from said first container;
means for monitoring said monitoring fluid to detect when the volume of said monitoring fluid in said closed loop of fluid flow is not within a predetermined range of volumes;
means for monitoring said monitoring fluid to detect when the rate of flow of said monitoring fluid is not within a predetermined range of rates of flow; and
means for retrieving said second container and said first container from said storage cell when leakage of said non-radioactive hazardous material from said first container is detected.

5. A storage system for the storage of non-radioactive hazardous material as claimed in claim 1, claim 2, claim 3 or claim 4 having
means for cooling said monitoring fluid as said monitoring fluid flows through said closed loop of fluid flow;
a temperature measuring device in thermal contact with said monitoring fluid contained within said closed loop of fluid flow; and
means for monitoring said monitoring fluid to detect when the temperature of said monitoring fluid is not within a predetermined range of temperatures.

6. A storage system for the monitored retrievable storage of non-radioactive hazardous material comprising
a first container for containing non-radioactive hazardous material;
a second container for containing said first container;
a storage cell containing said second container;
a first conduit for transporting a monitoring fluid to a cavity between said first container and said second container when said first container is contained within said second container;
a second conduit for transporting said monitoring fluid from said cavity between said first container and said second container;
pump means connecting said first conduit and said second conduit for moving said monitoring fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;
a detector located within said closed loop of fluid flow for measuring the level of non-radioactive hazardous material present in said monitoring fluid flowing through said closed loop of fluid flow;
a volume measuring unit located within said closed loop of fluid flow for measuring a change in the volume of said monitoring fluid in said closed loop of fluid flow;
a flowmeter located within said closed loop of fluid flow for measuring the rate of flow of said monitoring fluid flowing through said closed loop of fluid flow;
means for determining when said detector detects the presence of a level of non-radioactive hazardous material in the monitoring fluid flowing through said closed loop of fluid flow that is not within a predetermined range of levels of non-radioactive hazardous material due to leakage of said non-radioactive hazardous material from said first container;
means for determining when said volume measuring unit detects a change in the volume of said monitoring fluid in said closed loop of fluid flow that causes the volume of said monitoring fluid to not be within a predetermined range of volumes;

means for determining when said flowmeter detects a rate of flow of said monitoring fluid flowing through said closed loop of fluid flow that is not within a predetermined range of rates of flow; and means for retrieving said second container and said first container from said storage cell when leakage of said non-radioactive hazardous material from said first container is detected.

7. A storage system for the monitored retrievable storage of non-radioactive hazardous material comprising a first container for containing non-radioactive hazardous material;

a second container for containing said first container;

a storage cell containing said second container;

a first conduit for transporting a monitoring fluid to a cavity between said first container and said second container when said first container is contained within said second container;

a second conduit for transporting said monitoring fluid from said cavity between said first container and said second container;

pump means connecting said first conduit and said second conduit for moving said monitoring fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;

a detector located within said closed loop of fluid flow for measuring the level of non-radioactive hazardous material present in said monitoring fluid flowing through said closed loop of fluid flow;

a volume measuring unit located within said closed loop of fluid flow for measuring a change in the volume of said monitoring fluid in said closed loop of fluid flow;

a flowmeter located within said closed loop of fluid flow for measuring the rate of flow of said monitoring fluid flowing through said closed loop of fluid flow;

a computer having at least one first input line connected to said detector for transmitting a first signal to said computer when said detector detects the presence of a level of non-radioactive hazardous material in said monitoring fluid flowing through said closed loop of fluid flow that is not within a predetermined range of levels of non-radioactive hazardous material due to leakage of said non-radioactive hazardous material from said first container, said computer having means for monitoring said first input line to detect said first signal and having means to indicate that said computer has detected said first signal on said first input line; and said computer having at least one second input line connected to said volume measuring unit for transmitting a second signal to said computer when said volume measuring unit detects a change in the volume of said monitoring fluid in said closed loop of fluid flow that causes the volume of said monitoring fluid to not be within a predetermined range of volumes, said computer having means for monitoring said second input line to detect said second signal and having means for indicating that said computer has detected said second signal on said second input line; and said computer having at least one third input line connected to said flowmeter for transmitting a third signal to said computer when said flowmeter detects a rate of flow of said monitoring fluid flowing through said closed loop of fluid flow that is not within a predetermined range of rates of flow, said computer having means for monitoring said third input line to detect said third signal and having means for indicating that said computer has detected said third signal on said third input line; and means for retrieving said second container and said first container from said storage cell when leakage of said non-radioactive hazardous material from said first container is detected.

8. A storage system for the monitored retrievable storage of non-radioactive hazardous material as claimed in claim 6 or claim 7 having means for cooling said monitoring fluid as said monitoring fluid flows through said closed loop of fluid flow; and a temperature measuring device in thermal contact with said monitoring fluid contained within said closed loop of fluid flow; and means for determining when said temperature measuring device measures a temperature of said monitoring fluid that is not within a predetermined range of temperatures.

9. A storage system for the monitored storage of non-radioactive hazardous material comprising a first container for containing non-radioactive hazardous material;

a second container for containing said first container;

a first conduit for transporting a first fluid to a cavity between said first container and said second container when said first container is contained within said second container;

a second conduit for transporting said first fluid from said cavity between said first container and said second container;

pump means connecting said first conduit and said second conduit for moving said first fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;

a detector for detecting a second fluid located within said closed loop of fluid flow for detecting the presence of said second fluid in said first fluid flowing through said closed loop of fluid flow; and means for determining when said detector for detecting said second fluid detects the presence of a volume of said second fluid in said first fluid flowing through said closed loop of fluid flow that is not within a predetermined range of volumes of second fluid, said volume of said second fluid being due to leakage of said second fluid into said closed loop of fluid flow from outside and said second container.

10. A storage system for the monitored retrievable storage of non-radioactive hazardous material comprising a first container for containing non-radioactive hazardous material;

a second container for containing said first container;

a storage cell containing said second container;

a first conduit for transporting a first fluid to a cavity between said first container and said second container when said first container is contained within said second container;

a second conduit for transporting said first fluid from said cavity between said first container and said second container;

pump means connecting said first conduit and said second conduit for moving said first fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;

a detector for detecting a second fluid located within said closed loop of fluid flow for detecting the presence of said second fluid in said first fluid flowing through said closed loop of fluid flow;

means for determining when said detector for detecting said second fluid detects the presence of a volume of said second fluid in said first fluid flowing through said closed loop of fluid flow that is not within a predetermined range of volumes of second fluid, said volume of said second fluid being due to leakage of said second fluid into said closed loop of fluid flow from outside said second container; and means for retrieving said second container and said first container from said storage cell when said volume of said second fluid from outside said second container is detected.

11. A storage system for the monitored retrievable storage of non-radioactive hazardous material comprising a first container for containing non-radioactive hazardous material;

a second container for containing said first container;

a storage cell containing said second container;

means for circulating a first fluid in a closed loop of fluid flow through a cavity between said first container and said second container when said first container is contained within said second container, said closed loop of fluid flow through said cavity covering substantially the entire exterior surface of said first container;

means located within said closed loop of fluid flow for monitoring said first fluid to detect the migration of a second fluid into said cavity between said first container and said second container from outside said second container;

means for monitoring said first fluid to detect when the volume of said first fluid in said closed loop of fluid flow is not within a predetermined range of volumes;

means for monitoring said first fluid to detect when the rate of flow of said first fluid is not within a predetermined range of rates of flow; and means for retrieving said second container and said first container from said storage cell when said second fluid from outside said second container is detected.

12. A storage system for the monitored retrievable storage of non-radioactive hazardous material comprising a first container for containing non-radioactive hazardous material;

a second container for containing said first container;

a storage cell containing said second container;

a first conduit for transporting a first fluid to a cavity between said first container and said second container when said first container is contained within said second container;

a second conduit for transporting said first fluid from said cavity between said first container and said second container;

pump means connecting said first conduit and said second conduit for moving said first fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;

a detector for detecting a second fluid located within said closed loop of fluid flow for detecting the presence of said second fluid in said first fluid flowing through said closed loop of fluid flow;

means for determining when said detector for detecting said second fluid detects the presence of a volume of said second fluid in said first fluid flowing through said closed loop of fluid flow that is not within a predetermined range of volumes of second fluid, said volume of said second fluid being due to leakage of said second fluid into said closed loop of fluid flow from outside said second container;

means for monitoring said first fluid to detect when the volume of said first fluid in said closed loop of fluid flow is not within a predetermined range of volumes;

means for monitoring said first fluid to detect when the rate of flow of said first fluid is not within a predetermined range of rates of flow; and means for retrieving said second container and said first container from said storage cell when said volume of said second fluid from outside said second container is detected.

13. A storage system for the monitored retrievable storage of non-radioactive hazardous material comprising a first container for containing non-radioactive hazardous material;

a second container for containing said first container;

a storage cell containing said second container;

a first conduit for transporting a first fluid to a cavity between said first container and said second container when said first container is contained within said second container;

a second conduit for transporting said first fluid from said cavity between said first container and said second container;

pump means connecting said first conduit and said second conduit for moving said first fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;

a detector for detecting a second fluid located within said closed loop of fluid flow for detecting the presence of said second fluid in said first fluid flowing through said closed loop of fluid flow;

a volume measuring unit located within said closed loop of fluid flow for measuring a change in the volume of said first fluid in said closed loop of fluid flow;

a flowmeter located within said closed loop of fluid flow for measuring the rate of flow of said first fluid flowing through said closed loop of fluid flow;

a computer having at least one first input line connected to said detector for detecting said second fluid for transmitting a first signal to said computer when said detector for detecting said second fluid detects the presence of a volume of said second fluid in said first fluid that is not within a predetermined range of volumes of second fluid, said volume of said second fluid being due to leakage of said second fluid into said closed loop of fluid flow from outside said second container, said computer having means for monitoring said first input line to detect said first signal and having means to indicate that said computer has detected said first signal on said first input line; and said computer having at least one second input line connected to said volume measuring unit for transmitting a second signal to said computer when said volume measuring unit detects a change in the volume of said first fluid in said closed loop of fluid flow that causes the volume of said first fluid to not be within a predetermined range of volumes, said computer having means for monitoring said second input line to detect said second signal and having means for indicating that said computer has detected said second signal on said second input line; and said computer having at least one third input line connected to said flowmeter for transmitting a third signal to said computer when said flowmeter detects a rate of flow of said first fluid flowing through said closed loop of fluid flow that is not within a predetermined range of rates of flow, said computer having means for monitoring said third input line to detect said third signal and having means for indicating that said computer has detected said third signal on said third input line; and means for retrieving said second container and said first container from said storage cell when said volume of said second fluid from outside said second container is detected.

14. A storage system for the monitored retrievable storage of non-radioactive hazardous material comprising a first container for containing non-radioactive hazardous material;

a second container for containing said first container;

a storage cell containing said second container;

means for circulating a first fluid in a closed loop of fluid flow through a cavity between said first container and said second container when said first container is contained within said second container, said closed loop of fluid flow through said cavity covering substantially the entire exterior surface of said first container;

means located within said closed loop of fluid flow for monitoring said first fluid to detect leakage of said non-radioactive hazardous material from said first container;

means located within said closed loop of fluid flow for monitoring said first fluid to detect the migration of a second fluid into said cavity between said first container and said second container from outside said second container;

means for monitoring said first fluid to detect when the volume of said first fluid in said closed loop of fluid flow is not within a predetermined range of volumes;

means for monitoring said first fluid to detect when the rate of flow of said first fluid is not within a predetermined range of rates of flow; and means for retrieving said second container and said first container from said storage cell when leakage of said non-radioactive hazardous material from said first container is detected or when said second fluid from outside said second container is detected.

15. A storage system for the monitored retrievable storage of non-radioactive hazardous material as claimed in claim 11, claim 12 or claim 14 having means for cooling said first fluid as said first fluid flows through said closed loop of fluid flow;

a temperature measuring device in thermal contact with said first fluid contained within said closed loop of fluid flow; and means for monitoring said first fluid to detect when the temperature of said first fluid is not within a predetermined range of temperatures.

16. A storage system for the monitored retrievable storage of non-radioactive hazardous material comprising a first container for containing non-radioactive hazardous material;

a second container for containing said first container;

a storage cell containing said second container;

a first conduit for transporting a first fluid to a cavity between said first container and said second container when said first container is contained within said second container;

a second conduit for transporting said first fluid from said cavity between said first container and said second container;

pump means connecting said first conduit and said second conduit for moving said first fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;

a first detector located within said closed loop of fluid flow for measuring the level of non-radioactive hazardous material present in said first fluid flowing through said closed loop of fluid flow;

means for determining when said first detector detects the presence of a level of non-radioactive hazardous material in said first fluid flowing through said closed loop of fluid flow that is not within said predetermined range of levels of non-radioactive hazardous material due to leakage of said non-radioactive hazardous material from said first container;

a second detector for detecting a second fluid located within said closed loop of fluid flow for detecting the presence of said second fluid in said first fluid flowing through said closed loop of fluid flow;

means for determining when said second detector for detecting said second fluid detects the presence of a volume of said second fluid in said first fluid that is not within a predetermined range of volumes of second fluid, said volume of said second fluid being due to leakage of said second fluid into said closed loop of fluid flow from outside said second container; and means for retrieving said second container and said first container from said storage cell when leakage of said non-radioactive hazardous material from said first container is detected or when said second fluid from outside said second container is detected.

17. A storage system for the monitored retrievable storage of non-radioactive hazardous material comprising a first container for containing non-radioactive hazardous material;

a second container for containing said first container;

a storage cell containing said second container;

a first conduit for transporting a first fluid to a cavity between said first container and said second container when said first container is contained within said second container;

a second conduit for transporting said first fluid from said cavity between said first container and said second container;

pump means connecting said first conduit and said second conduit for moving said first fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;

a first detector located within said closed loop of fluid flow for measuring the level of non-radioactive hazardous material present in said first fluid flowing through said closed loop of fluid flow;

a second detector for detecting a second fluid located within said closed loop of fluid flow for detecting the presence of said second fluid in said first fluid flowing through said closed loop of fluid flow;

a volume measuring unit located within said closed loop of fluid flow for measuring a change in the volume of said first fluid in said closed loop of fluid flow;

a flowmeter located within said closed loop of fluid flow for measuring the rate of flow of said first fluid flowing through said closed loop of fluid flow;

means for determining when said first detector detects the presence of a level of non-radioactive hazardous material in said first fluid flowing through said closed loop of fluid flow that is not within a predetermined range of levels of non-radioactive hazardous material due to leakage of said non-radioactive hazardous material from said first container;

means for determining when said second detector for detecting said second fluid detects the presence of a volume of said second fluid in said first fluid that is not within a predetermined range of volumes of second fluid, said volume of said second fluid being due to leakage of said second fluid into said closed loop of fluid flow from outside said second container;

means for determining when said volume measuring unit detects a change in the volume of said first fluid in said closed loop of fluid flow that causes the volume of said first fluid to not be within a predetermined range of volumes;

means for determining when said flowmeter detects a rate of flow of said first fluid flowing through said closed loop of fluid flow that is not within a predetermined range of rates of flow; and means for retrieving said second container and said first container from said storage cell when leakage of said non-radioactive hazardous material from said first container is detected or when said second fluid from outside said second container is detected.

18. A storage system for the monitored retreivable storage of non-radioactive hazardous material comprising a first container for containing non-radioactive hazardous material;

a second container for containing said first container;

a storage cell containing said second container;

a first conduit for transporting a first fluid to a cavity between said first container and said second container when said first container is contained within said second container;

a second conduit for transporting said first fluid from said cavity between said first container and said second container;

pump means connecting said first conduit and said second conduit for moving said first fluid through said first conduit, through said cavity between said first container and said second container, through said second conduit, through said pump means and back into said first conduit in a continuous closed loop of fluid flow, said closed loop of fluid flow through said cavity covering substantially the entire exterior surface of said first container;

a first detector located within said closed loop of fluid flow for measuring the level of non-radioactive hazardous material present in said first fluid flowing through said closed loop of fluid flow;

a second detector for detecting a second fluid located within said closed loop of fluid flow for detecting the presence of said second fluid in said first fluid flowing through said closed loop of fluid flow;

a volume measuring unit located within said closed loop of fluid flow for measuring a change in the volume of said first fluid in said closed loop of fluid flow;

a flowmeter located within said closed loop of fluid flow for measuring the rate of flow of said first fluid flowing through said closed loop of fluid flow;

a computer having at least one first input line connected to said first detector for transmitting a first signal to said computer when said first detector detects the presence of a level of non-radioactive hazardous material in said first fluid flowing through said closed loop of fluid flow that is not within a predetermined range of levels of non-radioactive hazardous material due to leakage of said non-radioactive hazardous material from said first container, said computer having means for monitoring said first input line to detect said first signal and having means to indicate that said computer has detected said first signal on said first input line; and said computer having at least one second input line connected to said second detector for detecting said second fluid for transmitting a second signal to said computer when said second detector for detecting said second fluid detects the presence of a volume of said second fluid in said first fluid that is not within a predetermined range of volumes of second fluid, said volume of said second fluid being due to leakage of said second fluid into said closed loop of fluid flow from outside said second container, said computer having means for monitoring said second input line to detect said second signal and having means to indicate that said computer has detected said second signal on said second input line; and said computer having at least one third input line connected to said volume measuring unit for transmitting a third signal to said computer when said volume measuring unit detects a change in the volume of said first fluid in said closed loop of fluid flow that causes the volume of said first fluid to not be within a predetermined range of volumes, said computer having means for monitoring said third input line to detect said third signal and having means for indicating that said computer has detected said third signal on said third input line; and said computer having at least one fourth input line connected to said flowmeter for transmitting a fourth signal to said computer when said flowmeter detects a rate of flow of said first fluid flowing through said closed loop of fluid flow that is not within a predetermined range of rates of flow, said computer having means for monitoring said fourth input line to detect said fourth signal and having means for indicating that said computer has detected said fourth signal on said fourth input line; and means for retrieving said second container and said first container from said storage cell when leakage of said non-radioactive hazardous material from said first container is detected or when said second fluid from outside said second container is detected.

19. A storage system for the monitored retrievable storage of non-radioactive hazardous material as claimed in claim 13, claim 17 or claim 18 having means for cooling said first fluid as said first fluid flows through said closed loop of fluid flow; and a temperature measuring device in thermal contact with said first fluid contained within said closed loop of fluid flow; and means for determining when said temperature measuring device measures a temperature of said first fluid that is not within a predetermined range of temperatures.

20. A storage system for the monitored retrievable storage of non-radioactive hazardous material comprising a first container for containing non-radioactive hazardous material;

a second container for containing said first container;

a third container for containing said second container;

a fourth container for containing said third container:

a storage cell containing said fourth container;

means for circulating a first fluid in a first closed loop of fluid flow through a first cavity between said first container and said second container when said first container is contained within said second container, said first closed loop of fluid flow through said first cavity covering substantially the entire exterior surface of said first container;

means for circulating a second fluid in a second closed loop of fluid flow through a second cavity between said third container and said fourth container when said third container is contained within said fourth container, when said second container is contained within said third container, said second closed loop of fluid flow through said second cavity covering substantially the entire exterior surface of said third container;

means located within said first closed loop of fluid flow for monitoring said first fluid to detect leakage of said non-radioactive hazardous material from said first container;

means located within said second closed loop of fluid flow for monitoring said second fluid to detect the migration of a third fluid into said second cavity between said third container and said fourth container from outside said fourth container; and means for retrieving said fourth container and said third container and said second container and said first container from said storage cell when said non-radioactive hazardous material from said first container is detected or when said third fluid from outside said fourth container is detected.

21. A storage system for the monitored retrievable storage of non-radioactive hazardous material comprising a first container for containing non-radioactive hazardous material;

a second container for containing said first container;

a third container for containing said second container;

a fourth container for containing said third container;

a storage cell containing said fourth container;

a first conduit for transporting a first fluid to a first cavity between said first container and said second container when said first container is contained within said second container;

a second conduit for transporting said first fluid from said first cavity between said first container and said second container;

a third conduit for transporting a second fluid to a second cavity between said third container and said fourth container when said third container is contained within said fourth container, when said second container is contained within said third container;

a fourth conxduit for transporting said second fluid from said second cavity between said third container and said fourth container;

first pump means connecting said first conduit and said second conduit for moving said first fluid through said first conduit, through said first cavity between said first container and said second container, through said second conduit, through said first pump means and back into said first conduit in a continuous first closed loop of fluid flow, said first closed loop of fluid flow through said first cavity covering substantially the entire exterior surface of said first container;

second pump means connecting said third conduit and said fourth conduit for moving said second fluid through said third conduit, through said second cavity between said third container and said fourth container, through said fourth conduit, through said second pump means and back into said third conduit in a continuous second closed loop of fluid flow, said second closed loop of fluid flow through said second cavity covering substantially the entire exterior surface of said third container;

a first detector located within said first closed loop of fluid flow for measuring the level of non-radioactive hazardous material present in said first fluid flowing through said first closed loop of fluid flow;

means for determining when said first detector detects the presence of a level of non-radioactive hazardous material in said first fluid flowing through said first closed loop of fluid flow that is not within a predetermined range of levels of non-radioactive hazardous material due to leakage of said non-radioactive hazardous material from said first container; and a second detector for detecting a third fluid located within said second closed loop of fluid flow for detecting the presence of a volume of said third fluid in said second fluid flowing thrugh said second closed loop of fluid flow;

means for determining when said second detector for detecting said third fluid detects the presence of a volume of said third fluid in said second fluid that is not within a predetermined range of volumes of third fluid, said volume of said third fluid being due to leakage of said third fluid into said second closed loop of fluid flow from outside said fourth container; and means for retrieving said fourth container and said third container and said second container and said first container from said storage cell when said non-radioactive hazardous material from said first container is detected or when said third fluid from outside said fourth container is detected.

22. A storage system for the monitored retrievable storage of non-radioactive hazardous material comprising a first container for containing non-radioactive hazardous material;
a second container for containing said first container;
a third container for containing said second container;
a fourth container for containing said third container;
a storage cell containing said fourth container;
a first conduit for transporting a first fluid to a first cavity between said first container and said second container when said first container is contained within said second container;
a second conduit for transporting said first fluid from said first cavity between said first container and said second container;
a third conduit for transporting a second fluid to a second cavity between said third container and said fourth container when said third container is contained within said fourth container, when said second container is contained with said third container;
a fourth conduit for transporting said second fluid from said second cavity between said third container and said fourth container;

first pump means connecting said first conduit and said second conduit for moving said first fluid through said first conduit, through said first cavity between said first container and said second container, through said second conduit, through said first pump means and back into said first conduit in a continuous first closed loop of fluid flow, said first closed loop of fluid flow through said first cavity covering substantially the entire exterior surface of said first container;

second pump means connecting said third conduit and said fourth conduit for moving said second fluid through said third conduit, through said second cavity between said third container and said fourth container, through said fourth conduit, through said second pump means and back into said third conduit in a continuous second closed loop of fluid flow, said second closed loop of fluid flow through said second cavity covering substantially the entire exterior surface of said third container;

a first detector located within said first closed loop of fluid flow for measuring the level of non-radioactive hazardous material present in said first fluid flowing through said first closed loop of fluid flow;

means for determining when said first detector detects the presence of a level of non-radioactive hazardous material in said first fluid flowing through said first closed loop of fluid flow that is not within a predetermined range of levels of non-radioactive hazardous material due to leakage of said non-radioactive hazardous material from said first container;

a second detector for detecting a third fluid located within said second closed loop of fluid flow for detecting the presence of a volume of said third fluid in said second fluid flowing through said second closed loop of fluid flow;

means for determining when said second detector for detecting said third fluid detects the presence of a volume of said third fluid in said second fluid that is not within a predetermined range of volumes of third fluid, said volume of said third fluid being due to leakage of said third fluid into said second closed loop of fluid flow from outside said fourth container;

a first volume measuring unit located within said first closed loop of fluid flow for measuring a change in the volume of said first fluid in said first closed loop of fluid flow;

means for determining when said first volume measuring unit detects a change in the volume of said first fluid in said first closed loop of fluid flow that causes the volume of said fluid to not be within a predetermined range of volumes;

a second volume measuring unit located within said second closed loop of fluid flow for measuring a change in the volume of said second fluid in said second closed loop of fluid flow;

means for determining when said second volume measuring unit detects a change in the volume of said second fluid in said second closed loop of fluid flow that causes the volume of said second fluid to not be within a predetermined range of volumes;

a first flowmeter located within said first closed loop of fluid flow for measuring the rate of flow of said first fluid flowing through said first closed loop of fluid flow;

means for determining when said first flowmeter detects a rate of flow of said first fluid flowing through said first closed loop of fluid flow that is not within a predetermined range of rates of flow;

a second flowmeter located within said second closed loop of fluid flow for measuring the rate of flow of said second fluid flowing through said second closed loop of fluid flow;

means for determining when said second flowmeter detects a rate of flow of said second fluid flowing through said second closed loop of fluid flow that is not within a predetermined range of rates of flow; and means for retrieving said fourth container and said third container and said second container and said first container from said storage cell when said non-radioactive hazardous material from said first container is detected or when said third fluid from outside said fourth container is detected.

23. A storage system for the monitored retrievable storage of non-radioactive hazardous material comprising a plurality of sets of nested containers in which each set of nested containers in said plurality of sets comprises a first container for containing non-radioactive hazardous material and a second container for containing said first container;

a plurality of storage cells for containing said plurality of sets of nested containers in which each storage cell in said plurality of storage cells contains at least one set of nested containers;

means for circulating a plurality of quantities of monitoring fluid in a plurality of closed loops of fluid flow through each of the respective cavities between said first container and said second container of each set of nested containers in said plurality of nested containers, each respective closed loop of fluid flow through each respective cavity covering substantially the entire exterior surface of each respective first container;

means located within each respective closed loop of fluid flow for monitoring each respective quantity of monitoring fluid to detect leakage of said non-radioactive hazardous material from each respective first container;

means located within each respective closed loop of fluid flow for monitoring each respective quantity of monitoring fluid to detect when the volume of said respective quantity of monitoring fluid in said respective closed loop of fluid flow is not within a predetermined range of volumes;

means located within each respective closed loop of fluid flow for monitoring each respective quantity of monitoring fluid to detect when the rate of flow of said respective quantity of monitoring fluid in said respective closed loop of fluid flow is not within a predetermined range of rates of flow;

means for identifying a set of nested containers in said plurality of sets of nested containers having a first container that is leaking non-radioactive hazardous material; and means for retrieving said set of nested containers having a first container that is leaking non-radioactive hazardous material from its respective storage cell when leakage of said non-radioactive hazardous material from said first container of said set of nested containers is detected.

24. A storage system as claimed in claim 23 having means located within each respective closed loop of fluid flow for monitoring each respective quantity of monitoring fluid to detect the migration of a external fluid into said respective closed loop of fluid flow from outside said respective second container;

means for identifying a set of nested containers in said plurality of sets of nested containers having a second container that is admitting external fluid into said respective closed loop of fluid flow; and means for retrieving said set of nested containers having a second container that is admitting external fluid into said respective closed loop of fluid flow when the presence of said external fluid is detected.

25. A storage system for the monitored storage of non-radioactive hazardous material comprising a plurality of sets of nested containers in which each set of nested containers in said plurality of sets comprises a first container for containing non-radioactive hazardous material and a second container for containing said first container;

means for circulating a plurality of quantities of monitoring fluid in a plurality of closed loops of fluid flow through each of the respective cavities between said first container and said second container of each set of nested containers in said plurality of nested containers, each respective closed loop of fluid flow through each respective cavity covering substantially the entire exterior surface of each respective first container;

means located within each respective closed loop of fluid flow for monitoring each respective quantity of monitoring fluid to detect leakage of said non-radioactive hazardous material from each respective first container;

means located within each respective closed loop of fluid flow for monitoring each respective quantity of monitoring fluid to detect when the volume of said respective quantity of monitoring fluid in said respective closed loop of fluid flow is not within a predetermined range of volumes;

means located within each respective closed loop of fluid flow for monitoring each respective quantity of monitoring fluid to detect when the rate of flow of said respective quantity of monitoring fluid in said respective closed loop of fluid flow is not within a predetermined range of rates of flow; and means for identifying a set of nested containers in said plurality of sets of nested containers having a first container that is leaking non-radioactive hazardous material.

26. A storage system as claimed in claim 25 having means located within each respective closed loop of fluid flow for monitoring each respective quantity of monitoring fluid to detect the migration of an external fluid into said respective closed loop of fluid flow from outside said respective second container; and means for identifying a set of nested containers in said plurality of sets of nested containers having a second container that is admitting external fluid into said respective closed loop of fluid flow.

27. A method for monitoring the storage of non-radioactive hazardous material comprising placing non-radioactive hazardous material in a first container;
placing said first container within a second container;
placing said second container within a storage cell;
circulating monitoring fluid in a closed loop of fluid flow through a cavity between said first container and said second container when said first container is contained within said second container, said closed loop of fluid flow through said cavity covering substantially the entire exterior surface of said first container;
monitoring the volume of said monitoring fluid in said closed loop of fluid flow to detect when the volume of said monitoring fluid in said closed loop of fluid flow is not within a predetermined range of volumes;
monitoring the rate of flow of said monitoring fluid in said closed loop of fluid flow to detect when the rate of flow of said monitoring fluid in said closed loop of fluid flow is not within a predetermined range of rates of flow;
extracting samples of said monitoring fluid from said closed loop of fluid flow;
analyzing said samples of said monitoring fluid extracted from said closed loop of fluid flow to detect the presence of said non-radioactive hazardous material in said samples of said monitoring fluid indicative of leakage of said non-radioactive hazardous material from said first container; and
retrieving said second container and said first container from said storage cell when leakage of said non-radioactive hazardous material from said first container is detected.

28. A method for continuously monitoring the storage of non-radioactive hazardous material comprising
placing non-radioactive hazardous material in a first container;
placing said first container within a second container;
placing said second container within a storage cell;
continuously circulating monitoring fluid in a closed loop of fluid flow through a cavity between said first container and said second container when said first container is contained within said second container, said closed loop of fluid flow through said cavity covering substantially the entire exterior surface of said first container;
monitoring the volume of said monitoring fluid in said closed loop of fluid flow to detect when the volume of said monitoring fluid in said closed loop of fluid flow is not within a predetermined range of volumes;
monitoring the rate of flow of said monitoring fluid in said closed loop of fluid flow to detect when the rate of flow of said monitoring fluid in said closed loop of fluid flow is not within a predetermined range of rates of flow;
analyzing portions of said monitoring fluid in said closed loop of fluid flow with a detector located within said closed loop of fluid flow to detect the presence of said non-radioactive hazardous material in said portions of said monitoring fluid indicative of leakage of said non-radioactive hazardous material from said first container; and
retrieving said second container and said first container from said storage cell when leakage of said non-radioactive hazardous material from said first container is detected.

29. A method for monitoring the storage of non-radioactive hazardous material comprising
placing non-radioactive hazardous material in a first container;
placing said first container within a second container;
circulating monitoring fluid in a closed loop of fluid flow through a cavity between said first container and said second container when said first container is contained within said second container, said closed loop of fluid flow through said cavity covering substantially the entire exterior surface of said first container;
monitoring the volume of said monitoring fluid in said closed loop of fluid flow to detect when the volume of said monitoring fluid in said closed loop of fluid flow is not within a predetermined range of volumes;
monitoring the rate of flow of said monitoring fluid in said closed loop of fluid flow to detect when the rate of flow of said monitoring fluid in said closed loop of fluid flow is not within a predetermined range of rates of flow;
extracting samples of said monitoring fluid from said closed loop of fluid flow; and
analyzing said samples of said monitoring fluid extracted from said closed loop of fluid flow to detect the presence of said non-radioactive hazardous material in said samples of said monitoring fluid indicative of leakage of said non-radioactive hazardous material from said first container.

30. A method for continuously monitoring the storage of non-radioactive hazardous material comprising
placing non-radioactive hazardous material in a first container;
placing said first container within a second container;
continuously circulating monitoring fluid in a closed loop of fluid flow through a cavity between said first container and said second container when said first container is contained within said second container, said closed loop of fluid flow through said cavity covering substantially the entire exterior surface of said first container;
monitoring the volume of said monitoring fluid in said closed loop of fluid flow to detect when the volume of said monitoring fluid in said closed loop of fluid flow is not within a predetermined range of volumes;
monitoring the rate of flow of said monitoring fluid in said closed loop of fluid flow to detect when the rate of flow of said monitoring fluid in said closed loop of fluid flow is not within a predetermined range of rates of flow; and
analyzing portions of said monitoring fluid in said closed loop of fluid flow with a detector located within said closed loop of fluid flow to detect the presence of said non-radioactive hazardous material in said portions of said monitoring fluid indicative of leakage of said non-radioactive hazardous material from said first container.

31. A method for continuously monitoring the storage of solid non-radioactive hazardous material comprising
placing solid non-radioactive hazardous material in a first container;
placing said first container within a second container;
placing said second container within a storage cell;
continuously circulating a monitoring liquid having a thixotropic agent in a closed loop of fluid flow through a cavity between said first container and said second container when said first container is contained within said second container, said closed loop of fluid flow through said cavity covering substantially the entire exterior surface of said first container;

analyzing portions of said monitoring liquid in said closed loop of fluid flow with a detector located within said closed loop of fluid flow to detect the presence of said solid non-radioactive hazardous material in said portions of said monitoring liquid indicative of leakage of said solid non-radioactive hazardous material from said first container; and retrieving said second container and said first container from said storage cell when leakage of said solid non-radioactive hazardous material from said first container is detected.

32. A method for continuously monitoring the storage of solid non-radioactive hazardous material comprising placing solid non-radioactive hazardous material in a first container;

placing said first container within a second container;

continuously circulating a monitoring liquid having a thixotropic agent in a closed loop of fluid flow through a cavity between said first container and said second container when said first container is contained within said second container, said closed loop of fluid flow through said cavity covering substantially the entire exterior surface of said first container; and analyzing portions of said monitoring liquid in said closed loop of fluid flow with a detector located within said closed loop of fluid flow to detect the presence of said solid non-radioactive hazardous material in said portions of said monitoring liquid indicative of leakage of said solid non-radioactive hazardous material from said first container.

33. A method for continuously monitoring the storage of non-radioactive hazardous material comprising placing non-radioactive hazardous material in a first container;

placing said first container within a second container;

placing said second container within a storage cell;

continuously circulating a first fluid in a closed loop of fluid flow through a cavity between said first container and said second container when said first container is contained within said second container, said closed loop of fluid flow through said cavity covering substantially the entire exterior surface of said first container;

monitoring the volume of said first fluid in said closed loop of fluid flow to detect when the volume of said first fluid in said closed loop of fluid flow is not within a predetermined range of volumes;

monitoring the rate of flow of said first fluid in said closed loop of fluid flow to detect when the rate of flow of said first fluid in said closed loop of fluid flow is not within a predetermined range of rates of flow;

analyzing portions of said first fluid in said closed loop of fluid flow with a first detector located within said closed loop of fluid flow to detect the presence of said non-radioactive hazardous material in said portions of said first fluid indicative of leakage of said non-radioactive hazardous material from said first container;

analyzing portions of said first fluid in said closed loop of fluid flow with a second fluid detector located within said closed loop of fluid flow to detect the migration of a second fluid into said cavity between said first container and said second container from outside said second container;

retrieving said second container and said first container from said storage cell when leakage of said non-radioactive hazardous material from said first container is detected; and retrieving said second container and said first container from said storage cell when the migration of said second fluid into said cavity between said first container and said second container from outside said second container is detected.

34. A method for continuously monitoring the storage of non-radioactive hazardous material comprising placing non-radioactive hazardous material in a first container;

placing said first container within a second container;

continuously circulating a first fluid in a closed loop of fluid flow through a cavity between said first container and said second container when said first container is contained within said second container, said closed loop of fluid flow through said cavity covering substantially the entire exterior surface of said first container;

monitoring the volume of said first fluid in said closed loop of fluid flow to detect when the volume of said first fluid in said closed loop of fluid flow is not within a predetermined range of volumes;

monitoring the rate of flow of first fluid in said closed loop of fluid flow to detect when the rate of flow of said first fluid in said closed loop of fluid flow is not within a predetermined range of rates of flow;

analyzing portions of said first fluid in said closed loop of fluid flow with a first detector located within said closed loop of fluid flow to detect the presence of said non-radioactive hazardous material in said portions of said first fluid indicative of leakage of said non-radioactive hazardous material from said first container; and analyzing portions of said first fluid in said closed loop of fluid flow with a second fluid detector located within said closed loop of fluid flow to detect the migration of a second fluid into said cavity between said first container and said second container from outside said second container.

35. A method for monitoring the storage of non-radioactive hazardous material comprising placing non-radioactive hazardous material in a plurality of sets of nested containers in which each set of nested containers in said plurality of sets comprises a first container for containing non-radioactive hazardous material and a second container for containing said first container;

placing said plurality of sets of nested containers in a plurality of storage cells with each storage cell in said plurality of storage cells containing at least one set of nested containers;

continuously circulating a plurality of quantities of monitoring fluid in a plurality of closed loops of fluid flow through each of the respective cavities between said first container and said second container of each set of nested containers in said plurality of nested containers, each respective closed loop of fluid flow through each respective cavity covering substantially the entire exterior surface of each respective first container;

monitoring the volume of each respective quantity of said monitoring fluid in each respective closed loop of fluid flow to detect when the volume of said respective quantity of monitoring fluid in each respective closed loop of fluid flow is not within a predetermined range of volumes;

monitoring the rate of flow of each respective quantity of said monitoring fluid in each respective closed loop of fluid flow to detect when the rate of flow of said respective quantity of monitoring fluid in each respective closed loop of fluid flow is not within a predetermined range of rates of flow;

analyzing portions of monitoring fluid within each respective closed loop of fluid flow to detect leakage of said non-radioactive hazardous material from each respective first container;

analyzing portions of monitoring fluid within each respective closed loop of fluid flow to detect the migration of an external fluid into said respective closed loop of fluid flow from outside said respective second container;

retrieving from its respective storage cell said set of nested containers having a first container that is leaking non-radioactive hazardous material when leakage of said non-radioactive hazardous material from said first container of said set of nested containers is detected; and retrieving from its respective storage cell said set of nested containers having a second container that is admitting external fluid when the presence of said external fluid from outside said second container of said set of nested containers is detected.

36. A method for monitoring the storage of non-radioactive hazardous material comprising placing non-radioactive hazardous material in a plurality of sets of nested containers in which each set of nested containers in said plurality of sets comprises a first container for containing non-radioactive hazardous material and a second container for containing said first container;

continuously circulating a plurality of quantities of monitoring fluid in a plurality of closed loops of fluid flow through each of the respective cavities between said first container and said second container of each set of nested containers in said plurality of nested containers, each respective closed loop of fluid flow through each respective cavity covering substantially the entire exterior surface of each respective first container;

monitoring the volume of each respective quantity of said monitoring fluid in each respective closed loop of fluid flow to detect when the volume of said respective quantity of monitoring fluid in each respective closed loop of fluid flow is not within a predetermined range of volumes;

monitoring the rate of flow of each respective quantity of said monitoring fluid in each respective closed loop of fluid flow to detect when the rate of flow of said respective quantity of monitoring fluid in each respective closed loop of fluid flow is not within a predetermined range of rates of flow;

analyzing portions of monitoring fluid within each respective closed loop of fluid flow to detect leakage of said non-radioactive hazardous material from each respective first container; and analyzing portions of monitoring fluid within each respective closed loop of fluid flow to detect the migration of an external fluid into said respective closed loop of fluid flow from outside said respective second container.

* * * * *